United States Patent
Higashinaka et al.

(10) Patent No.: US 12,001,465 B2
(45) Date of Patent: Jun. 4, 2024

(54) RESPONSE SELECTING APPARATUS, RESPONSE SELECTING METHOD, AND RESPONSE SELECTING PROGRAM

(71) Applicant: NIPPON TELEGRAPH AND TELEPHONE CORPORATION, Tokyo (JP)

(72) Inventors: Ryuichiro Higashinaka, Kanagawa (JP); Masahiro Mizukami, Kyoto (JP); Junji Tomita, Kanagawa (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 361 days.

(21) Appl. No.: 17/050,330

(22) PCT Filed: Apr. 10, 2019

(86) PCT No.: PCT/JP2019/015624
§ 371 (c)(1),
(2) Date: Oct. 23, 2020

(87) PCT Pub. No.: WO2019/208222
PCT Pub. Date: Oct. 31, 2019

(65) Prior Publication Data
US 2021/0117458 A1 Apr. 22, 2021

(30) Foreign Application Priority Data
Apr. 27, 2018 (JP) .................................. 2018-086369

(51) Int. Cl.
*G06F 16/00* (2019.01)
*G06F 16/33* (2019.01)
(Continued)

(52) U.S. Cl.
CPC ...... *G06F 16/3344* (2019.01); *G06F 16/3329* (2019.01); *G06F 16/3334* (2019.01);
(Continued)

(58) Field of Classification Search
CPC .. G06F 16/3344; G06F 16/93; G06F 16/3334; G06F 16/3329; G06F 16/3346; G06F 40/30
(Continued)

(56) References Cited

U.S. PATENT DOCUMENTS

2009/0012926 A1   1/2009  Ishikawa et al.
2014/0358890 A1*  12/2014  Chen ................... G06F 16/9535
                                                    707/710
(Continued)

FOREIGN PATENT DOCUMENTS

JP    11-265400 A     9/1999
JP    2015-109068 A   6/2015
(Continued)

OTHER PUBLICATIONS

Soricut et al. (2004) Automatic Question Answering: Beyond the Factoid, Proceedings of the Human Language Technology Conference of the North American Chapter of the Association for Computational Linguistics: HLT-NAACL May 3, 2004, ACL Anthology [online], [retrieved on Jun. 10, 2019], Internet: <URL:https://www.aclweb.org/anthology/N04-1008>, pp. 57-64, particularly, section 4.4.2.
(Continued)

*Primary Examiner* — Monica M Pyo

(57) ABSTRACT

A response selecting apparatus includes a recording part, a document searching part, an information acquiring part, a score calculating part, and a ranking part. The document searching part searches for a question-answer pair from the question-answer pairs recorded in the recording part using
(Continued)

the input question as input. The information acquiring part acquires information for quantifying appropriateness of the search-result-question-answer pair with respect to the input question using the input question and the search-result-question-answer pair as input. The score calculating part calculates a score with respect to the input question for each of the search-result-question-answer pairs from a numerical value indicating appropriateness based on a search scheme and a numerical value based on the quantification information. The ranking part selects the search-result-question-answer pairs in descending order of appropriateness indicated by the scores and outputs the answers of the selected question-answer pairs as responses.

3 Claims, 7 Drawing Sheets

(51) Int. Cl.
*G06F 16/332* (2019.01)
*G06F 16/93* (2019.01)
*G06F 40/30* (2020.01)

(52) U.S. Cl.
CPC .......... *G06F 16/3346* (2019.01); *G06F 16/93* (2019.01); *G06F 40/30* (2020.01)

(58) Field of Classification Search
USPC .......................................................... 707/728
See application file for complete search history.

(56) References Cited

U.S. PATENT DOCUMENTS

| 2015/0066479 | A1* | 3/2015 | Pasupalak ......... G06F 16/90332 704/9 |
| 2015/0161242 | A1  | 6/2015 | Visotski et al. |
| 2015/0186528 | A1* | 7/2015 | Rao ..................... G06F 16/9535 707/710 |
| 2016/0171095 | A1  | 6/2016 | Visotski et al. |
| 2017/0228361 | A1* | 8/2017 | Zhang .................. G06F 16/313 |

FOREIGN PATENT DOCUMENTS

| JP | 2018-055548 A  | 4/2018 |
| WO | 2007/099812 A1 | 9/2007 |

OTHER PUBLICATIONS

Nakano et al. (2015) "Dialogue Systems," Corona Publishing Co., Ltd., Feb. 13, 2015.
Takeuchi et al. (2007) "Construction and optimization of a question and answer database for a real environment speech-oriented guidance system", in Proc. Oriental COCOSDA, pp. 149-154.
Leuski et al. (2009) "Building effective question answering characters", in Proc. SIGDIAL, pp. 18-27.
Miyazaki et al. (2016) "Towards an entertaining natural language generation system: Linguistic peculiarities of Japanese fictional characters", in Proc. SIGDIAL, pp. 319-328.
Li et al. (2016) "A persona-based neural conversation model", arXiv preprint arXiv:1603.06155.
"Niconico Super Conference 2018", Dwango Co., Ltd., Apr. 28, 2018, Internet: <URL: https://www.m-messe.co.jp/event/detail/4881> with translation generated by machine.
Higashinaka (2018) "Research into interactive systems that allow natural interaction with people", Jun. 25, 2018, Shonan Institute of Technology, Multimedia Education with translation generated by machine.
Higashinaka et al. (2018) "Role play-based question answering by real users for building chatbots with consistent personalities," Proceedings of the 19 Annual SIGdial Meeting on Discourse and Dialogue, Jul. 12-14, 2018 pp. 264-272, [uploaded on Jul. 9, 2018] Internet: <URL: https://www.sigdial.org/files/workshops/conference 19/proceedings/pdf/SIGdial31.pdf>.
Higashinaka (2018) "Toward a more talkative chat system", Jul. 5, 2018, Hokkaido University, Internet: <URL: https://www.ieice.org/hokkaido/?m=201806> with translation generated by machine.
Higashinaka et al. (2018) "Role play-based question answering for the collection of emotion-annotated utterances and automatic estimation of motion," ITE Annual Convention, [issued on Aug. 15, 2018] with translation generated by machine.
Higashinaka (2018) "Pursuing a Dialogue System for Making Society More Harmonious", NTT Technical Journal, vol. 30, No. 9, Sep. 1, 2018, Internet: <URL: https://www.nttreview.jp/archive/ntttechnical.php?contents=ntr201811fr1.html> with English version.
Higashinaka (2018) "Current Status and Issues of the Chatting Dialogue System", Oct. 24, 2018, Graduate School of Systems Science, Osaka University with translation generated by machine.
Higashinaka (2018) "Pursuing a Dialogue System for Making Society More Harmonious", NTT Technical Review, vol. 16, No. 11, Nov. 14, 2018, Internet: <URL: https://nttreview.jp/archive/ntttechnical.php?contents=ntr201811fr1.html>.
Higashinaka (2018) "Research on chat dialogue systems", Nov. 8, 2018, Information Engineering of Takushoku University with translation generated by machine.
Ishii et al. (2018) "Construction Method of Text-based Agent Dialogue System using Existing Animation Characters", Human-Agent Interaction Symposium [issued on Mar. 7, 2019] Internet: <URL: http://haiconference.net/symp2018/proceedings/pdf/G-3.pdf> with translation generated by machine.
"Role play-based AI: Tanaka Hime", Dwango Co., Ltd., [uploaded on Mar. 14, 2019] Internet: <URL: https://himetanaka-hh.narikiri-qa.jp/landing//> with translation generated by machine.
"Niconico Super Conference 2019", Dwango Co., Ltd., Apr. 27, 2019, Internet: <URL: https://chokaigi.jp/2019/> with translation generated by machine.

\* cited by examiner

| UTTERANCE ID | QUESTION SOURCE ID | UTTERANCE |
|---|---|---|
| 1 | None | WHAT IS YOUR FAVORITE FOOD? |
| 2 | None | WHAT DO YOU WANT FOR DINNER TONIGHT? |
| 3 | 1 | I'D EAT ANYTHING AS LONG AS IT'S EDIBLE! |
| 4 | 2 | I'D EAT ANYTHING AS LONG AS IT'S EDIBLE! |
| 5 | 2 | OH BOTHER, YUZUKE IS FINE! |
| 6 | None | WHAT DO YOU THINK OF HIDEYOSHI? |
| 7 | 6 | LITTLE MONKEY IS QUITE A LOVELY FELLOW |

FIG. 5

| UTTERANCE ID | UTTERANCE1 | UTTERANCE2 |
|---|---|---|
| 1 | WHAT IS YOUR FAVORITE FOOD? | I'D EAT ANYTHING AS LONG AS IT'S EDIBLE! |
| 2 | WHAT DO YOU WANT FOR DINNER TONIGHT? | I'D EAT ANYTHING AS LONG AS IT'S EDIBLE! |
| 3 | WHAT DO YOU WANT FOR DINNER TONIGHT? | OH BOTHER, YUZUKE IS FINE! |
| 4 | WHAT DO YOU THINK OF HIDEYOSHI? | LITTLE MONKEY IS QUITE A LOVELY FELLOW |

FIG. 6

RESPONSE SELECTING APPARATUS, RESPONSE SELECTING METHOD, AND RESPONSE SELECTING PROGRAM

CROSS-REFERENCE TO RELATED APPLICATIONS

This application is a U.S. 371 Application of International Patent Application No. PCT/JP2019/015624, filed on 10 Apr. 2019, which application claims priority to and the benefit of JP Application No. 2018-086369, filed on 27 Apr. 2018, the disclosures of which are hereby incorporated herein by reference in their entireties.

TECHNICAL FIELD

The present invention relates to a response selecting apparatus which outputs a response to an inputted question, a response selecting method, and a response selecting program.

BACKGROUND ART

A dialogue system (a voice agent, a personal robot) has come into daily use. The dialogue system is roughly classified into two types. One is a task-oriented dialogue system, and the other is a non-task-oriented dialogue system. The former is a system which performs a predetermined task through a dialogue, and the latter is a system which is principally involved with so-called daily conversation. These types are described in detail in Non-patent literature 1.

In recent years, in accordance with spread of a personal assistant on a smartphone, a personal robot, or the like, the need for continued interaction with a user increases. Therefore, also in a dialogue system, an answer which is consistent for a long period, that is, an answer having personality has been desired. Many methods for realizing individual answers by a dialogue system have been proposed. The most basic one is a method in which a dialogue rule or a question-answer pair associated with a specific character is prepared, and an answer is made using this. In systems of Non-patent literatures 2 and 3, individual answers are realized by question-answer pairs being prepared, and search being performed using these as examples.

In addition, study of providing personality to a dialogue system by rewriting expression of an end of a sentence, or the like, has been also performed. In Non-patent literature 4, personality is provided to an utterance sentence by using 13 types of rewriting rules.

Because it requires cost to manually create an utterance conversion rule, study of automatically generating an individual answer from dialogue data associated with a certain individual using a neural network has been also performed. Non-patent literature 5 discloses a configuration where a neural network for generating an answer dedicated to a certain user ID can be constituted by using both an utterance pair obtained from Twitter (registered trademark) and a user ID of a speaker.

PRIOR ART LITERATURE

Non-Patent Literature

Non-patent literature 1: Mikio Nakano, Kazunori Komatani, Kotaro Funakoshi, Yukiko Nakano, Manabu Okumura (editorial supervisor), "Dialogue System", Corona Publishing Co., Ltd., 2015.

Non-patent literature 2: Shota Takeuchi, Tobias Cincarek, Hiromichi Kawanami, Hiroshi Saruwatari, and Kiyohiro Shikano, "Construction and optimization of a question and answer database for a real-environment speech-oriented guidance system", in Proc. Oriental COCOSDA, pages 149-154, 2007.

Non-patent literature 3: Anton Leuski, Ronakkumar Patel, David Traum, and Brandon Kennedy, "Building effective question answering characters", in Proc. SIGDIAL, pages 18-27, 2009.

Non-patent literature 4: Chiaki Miyazaki, Toru Hirano, Ryuichiro Higashinaka, and Yoshihiro Matsuo, "Towards an entertaining natural language generation system: Linguistic peculiarities of Japanese fictional characters", in Proc. SIGDIAL, pages 319-328, 2016.

Non-patent literature 5: Jiwei Li, Michel Galley, Chris Brockett, Georgios P Spithourakis, Jianfeng Gao, and Bill Dolan, "A persona-based neural conversation model", arXiv preprint arXiv:1603.06155, 2016.

SUMMARY OF THE INVENTION

Problems to be Solved by the Invention

In a case where question-answer pairs are used, it is typical to search for a question whose meaning is close to meaning of a question inputted by a user from the question-answer pairs and response to the question using the answer. However, because it is not easy to accurately calculate closeness in meaning between questions, connection between the question inputted by the user and an answer to be obtained, or the like, there is problem that an appropriate response cannot be obtained.

The present invention has been made in view of such a problem and is directed to obtaining a more appropriate response to an inputted question.

Means to Solve the Problems

A response selecting apparatus of the present invention outputs one or a plurality of responses to an input question which is an inputted question. A response selecting apparatus of the present invention includes a recording part, a document searching part, an information acquiring part, a score calculating part and a ranking part. In the recording part, a plurality of question-answer pairs which are pairs of questions and answers are recorded. The document searching part searches for a question-answer pair from the question-answer pairs recorded in the recording part using the input question as input using a predetermined search scheme and outputs the question-answer pair as a search-result-question-answer pair. The information acquiring part acquires information for quantifying appropriateness of the search-result-question-answer pair with respect to the input question using the input question and the search-result-question-answer pair as input, and outputs the information as quantification information. The score calculating part calculates a score with respect to the input question for each of the search-result-question-answer pairs from a numerical value indicating appropriateness based on the search scheme and a numerical value based on the quantification information. The ranking part selects the search-result-question-answer pairs of the predetermined number in descending order of appropriateness indicated by the scores, and outputs answers of the selected search-result-question-answer pairs as responses.

Effects of the Invention

According to a response selecting apparatus of the present invention, because a question-answer pair is selected while appropriateness of the question-answer pair with respect to an input question is quantified, as well as the question-answer pair whose meaning of the question is close to meaning of the input question being searched for from question-answer pairs, it is possible to output a more appropriate answer as a response.

BRIEF DESCRIPTION OF THE DRAWINGS

FIG. 5 is a view illustrating an example of IDs of first utterance and second utterance;

FIG. 6 is a view illustrating an example of role play-based utterance sets recorded in a first recording part 1;

DETAILED DESCRIPTION OF THE EMBODIMENTS

Figure 1:
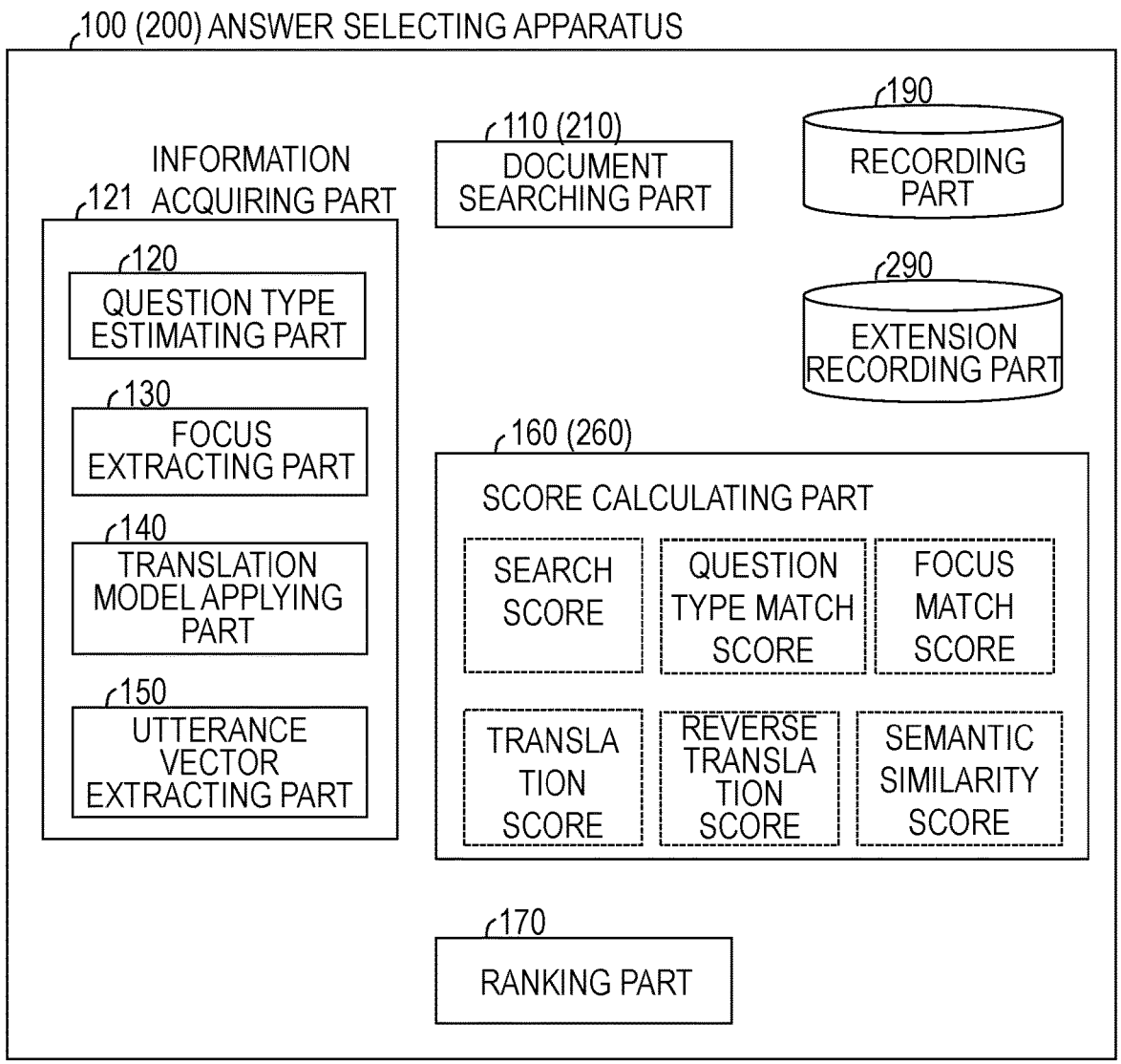
FIG. 1 is a view illustrating a functional configuration example of a response selecting apparatus according to a first embodiment and a second embodiment.

Embodiments of the present invention will be described in detail below. Note that the same reference numerals will be assigned to components having the same functions, and overlapped description will be omitted.

First Embodiment

Figure 2:
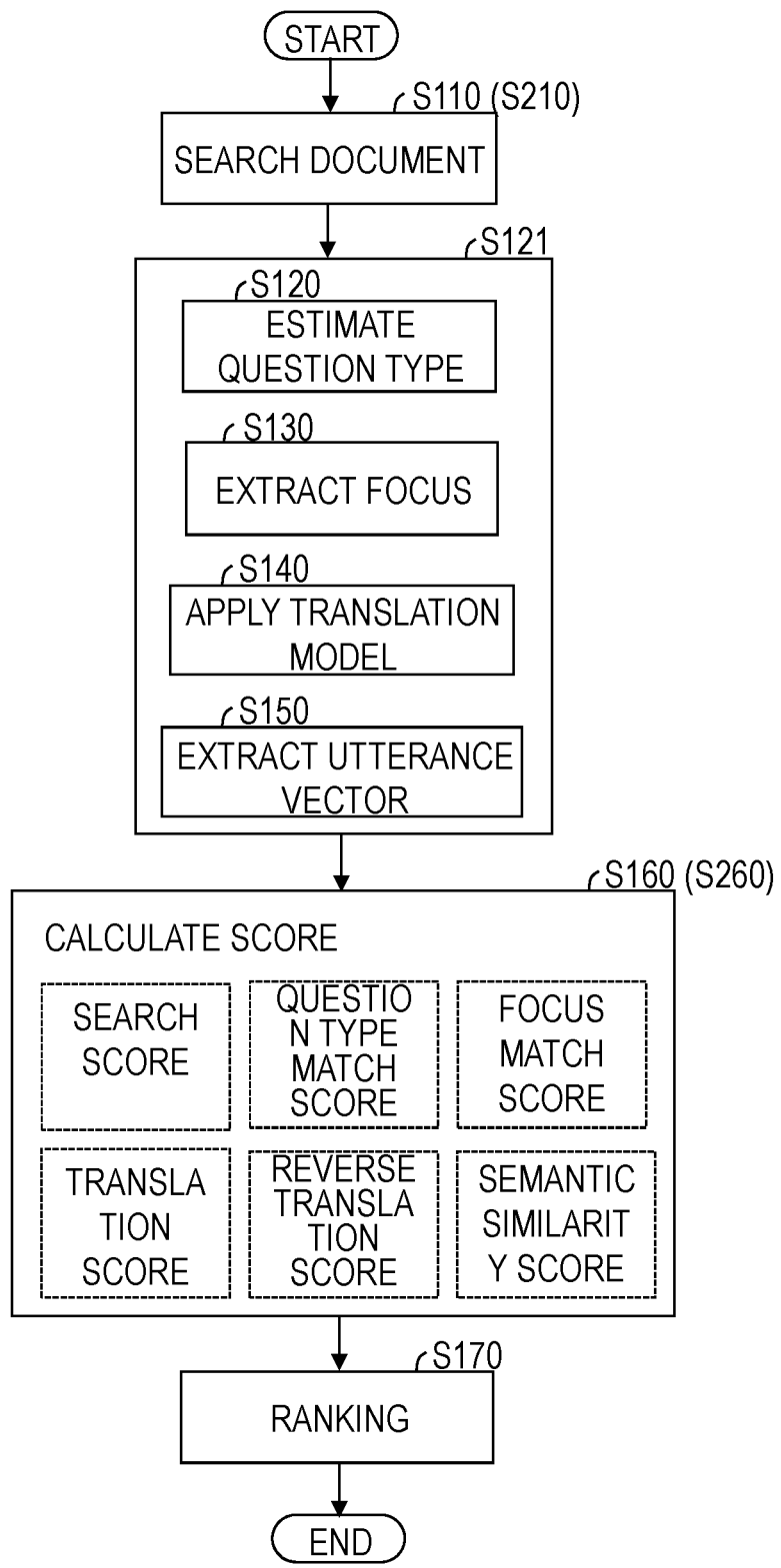
FIG. 2 is a view illustrating a processing flow example of the response selecting apparatus according to the first embodiment and the second embodiment.

FIG. 1 illustrates a functional configuration example of a response selecting apparatus according to a first embodiment. FIG. 2 illustrates a processing flow example of the response selecting apparatus according to the first embodiment. A response selecting apparatus 100 according to the first embodiment outputs one or a plurality of responses to an input question which is an inputted question. For example, M may be predetermined so that M responses are outputted. M is an integer equal to or greater than 1. For example, M may be determined such that M=5, or, in a case where it is desired to output only one response like a chatbot, M may be determined such that M=1. The response selecting apparatus 100 includes a recording part 190, a document searching part 110, an information acquiring part 121, a score calculating part 160 and a ranking part 170.

The recording part 190 records a plurality of question-answer pairs which are pairs of questions and answers. The pairs of the questions and the answers are pairs created assuming predetermined characters, such as a pair of a question: "Hello" and an answer: "Hi", and a pair of a question: "How old are you?" and an answer: "I'm 30 years old". The number of question-answer pairs may be determined as appropriate in accordance with types of assumed questions, or the like. If general questions as described above are assumed, for example, equal to or more than 10,000 question-answer pairs may be prepared.

The document searching part 110 searches for a question-answer pair from the question-answer pairs recorded in the recording part 190 using an input question as input using a predetermined search scheme and outputs the pair as a search-result-question-answer pair (S110). For example, it is only necessary to predetermine that up to N question-answer pairs are set as the search-result-question-answer pairs. N is an integer equal to or greater than M, and may be set at, for example, 10. Note that, while N is preferably equal to or greater than 2, N may be equal to or greater than 1. As the document searching part 110, it is possible to use a document search engine which is typically used (Reference 1: Hatena Blog, Nov. 12, 2014, "Summary of probabilistic information retrieval, Okapi BM25", [Accessed Apr. 10, 2018], the Internet, Retrieved from: http://sonickun.hatenablog.com/entry/2014/11/12/122806). Specifically, the document searching part 110 may extract content words (such as a noun, a verb and an adjective) from an input question through morphological analysis, search for a question-answer pair having a question including more content words which match important content words in the input question, and output the question-answer pair. Further, the document searching part 110 also outputs a numerical value indicating a degree of match of the important content words, and this numerical value is inputted to the score calculating part 160.

The score calculating part 160 obtains a numerical value indicating appropriateness based on the search scheme used at the document searching part 110 from the numerical value indicating the degree of match of the important content words outputted by the document searching part 110. For example, the score calculating part 160 obtains rank r of the search-result-question-answer pair from the numerical value indicating the degree of match of the important content words outputted by the document searching part 110. Then, the score calculating part 160 may obtain a numerical value indicating appropriateness based on the search scheme as follows:

$$1.0 - (r-1)/\text{max\_rank} \quad (1)$$

where max_rank is the number of the search-result-question-answer pairs. max_rank may be set at a maximum number N which can be searched by the document searching part 110. For example, in a case where max_rank=10 and r=5, the numerical value indicating appropriateness based on the search scheme becomes 0.6. In the following description, the numerical value indicating appropriateness based on the search scheme is set as a search score (search_score).

The information acquiring part 121 acquires information for quantifying appropriateness of the search-result-question-answer pair with respect to the input question, using the input question and the search-result-question-answer pair as input and outputs the information as quantification information (S121). More specifically, the information acquiring part 121 may include a question type estimating part 120, a focus extracting part 130, a translation model applying part 140, and an utterance vector extracting part 150. A numerical value based on the quantification information may be obtained within the score calculating part 160 using the quantification information outputted by the information acquiring part 121 as input of the score calculating part 160. This will be described in detail later.

<Case where Question Type Estimating Part 120 is Provided>

The question type estimating part 120 estimates information for specifying a question type of the input question and a question type of the search-result-question-answer pair (S120). In this case, the score calculating part 160 calculates a score so that the score indicates higher appropriateness as the question type of the input question better matches the question type of the search-result-question-answer pair based on the information for specifying the question type of the input question and the question type of the search-result-question-answer pair (S160). The information for specifying the question type may be the question type itself or may be a type of extended named entity included in the answer.

For example, the question type roughly includes two types, and one is called a general question type, which includes the following 15 types:

truth-false, name: others, explanation: meaning, quantity: others, name: location name, name: name of a person, explanation: cause, others, quantity: date, name: name of an organization, explanation: method, quantity: time, quantity: amount of money, other: selection, explanation: reputation, explanation: association.

The other is called a detailed question type, which is a question type indicating what kind of named entity (proper name and numerical representation) is specifically asked by the question. The detailed question type includes three hierarchical classes, and the bottom class includes 200 detailed question types. This type is based on a type of Sekine's extended named entity (Reference 2: Satoshi Sekine, Kiyoshi Sudo, and Chikashi Nobata, "Extended named entity hierarchy", in Proc, LREC, 2002, Reference 3: "Sekine's extended named entity hierarchy" Definition, Version 7.1.2, Sep. 16, 2016, [Accessed Apr. 6, 2018], the Internet, Retrieved from: https://nlp.cs.nyu.edu/ene/ene_j_20160801/Japanese_7_1_2_160917.htm). The first class includes 28 pieces of named entity, the second class includes 103 pieces of named entity, and the third class includes 200 pieces of named entity. There is a case where this hierarchy is not constituted with three classes depending on named entity. For example, concerning Spa, Spa is located immediately below Location in the first class. In such a case, concerning Spa, both the second class and the third class are Spa.

To estimate the question type from a question, a method of document classification using machine learning can be used. Specifically, a large amount of data in which questions and question types are respectively paired is prepared, and a classifier which estimates a question type from each question is constructed through the method of machine learning. This is a typical method of document classification. While it is possible to use, for example, logistic regression as a learning method, it is also possible to use a method such as support vector machine and a neural network. While information of unigram, bigram and trigram of words obtained by analyzing morphemes of a question may be used as features for learning, it is also possible to use word class information, or the like, other than the information of unigram, bigram and trigram.

In the present invention, a classifier is constructed for each class for the general question type and the detailed question type. Therefore, the question type estimating part 120 outputs four question types of a general question type, a detailed question type (first class), a detailed question type (second class), and a detailed question type (third class) for the question. For example, if the question is "where is your favorite spa?", the following output can be obtained:

General question type: location name
Detailed question type (first class): Location
Detailed question type (second class): Spa
Detailed question type (third class): Spa The reason why both the second class and the third class are Spa is that concerning Spa, both the second class and the third class are Spa.

The question type estimating part 120 outputs, for example, four question types for the input question, and four question types for the question of the search-result-question-answer pair. These four question types are an example of the quantification information. In this case, the four question types for the input question and the four question types for the question of the search-result-question-answer pair are inputted to the score calculating part 160 as the quantification information. For example, a numerical value based on the quantification information in a case where two question types match among the four question types may be obtained as 2/4=0.5. In this case, a greater numerical value indicates higher appropriateness. In the following description, the numerical value based on the question types will be referred to as a question type match score (qtypes_match_score). Because, by using the question type estimating part 120, it is easy to select a response which is adapted to the question type as well as a response in which important words match, it is possible to select a more appropriate response.

Note that the question type estimating part 120 may utilize the answer of the search-result-question-answer pair. In this case, the question type estimating part 120 outputs four question types for the input question, a general question type of the question of the search-result-question-answer pair, and a type of extended named entity included in the answer of the search-result-question-answer pair. For example, the question type estimating part 120 applies an extractor of extended named entity to the answer of the search-result-question-answer pair. By this means, what kind of extended named entity is included in the answer can be understood. For example, if the answer is "I went to spa at Kusatsu-shi", "Kusatsu-shi" and "spa" are extracted as extended named entity, and City and Spa are extracted as types of extended named entity. In this case, the extracted types of extended named entity are information for specifying the question type of the search-result-question-answer pair. Further, the four question types for the input question, the general question type of the question of the search-result-question-answer pair, and the type of the extended named entity of the search-result-question-answer pair are an example of the quantification information, and are inputted to the score calculating part 160. The score calculating part 160 quantifies the general question type as 1 or 0 in accordance with whether or not the input question matches the question of the search-result-question-answer pair. Further, the score calculating part 160 quantifies each of three classes of the detailed question type of the input question in accordance with whether a corresponding type of extended named entity is included in the answer. The score calculating part 160 sets 1 if the type is included in the answer, and sets 0 if the type is not included in the answer. Thereafter, a numerical value may be obtained, for example, such that 2/4=0.5. It is possible to calculate a question type match score (qtype_match_score) in a similar manner also through such processing.

<Case where Focus Extracting Part 130 is Provided>

The focus extracting part 130 extracts word strings which become topics as focus words for the input question and the question of the search-result-question-answer pair (S130). In this case, the score calculating part 160 calculates a score so that the score indicates higher appropriateness as the focus word of the input question better matches the focus word of the question of the search-result-question-answer pair (S160). The focus word is a word string (basically, a noun phrase) indicating a topic of an utterance sentence. For example, if a sentence is "I went to UK the other day", the focus word is "UK". To extract the focus word, a method of sequence labeling through machine learning can be used. Specifically, word strings which become focus words may be labeled for a number of sentences, and learn a condition as to what kind of word string becomes a focus word. For example, it is possible to construct a focus extractor which extracts a focus from data in which a focus portion is labeled using a machine learning approach called conditional random fields (CRF). Labeling an important portion in a sentence and extracting an important portion in an unknown sentence by CRF using an approach of sequence labeling is a technique which is typically used in language processing. The focus extracting part 130 extracts focus words from a question using this focus extractor and outputs these. Note that there is a case where a plurality of focus words are outputted, or in a case where a focus word is not included, output becomes an empty list. For example, if a question is "Do you live all by yourself now?", output becomes "living alone".

The focus extracting part 130 outputs the focus word of the input question and the focus word of the question of the search-result-question-answer pair. The focus word is also an example of the quantification information. The focus word of the input question and the focus word of the question of the search-result-question-answer pair are inputted to the score calculating part 160 as the quantification information. The score calculating part 160 may obtain a numerical value based on the quantification information as, for example, 1.0 in a case where there are the same focus word, or 0.0 in a case where there is no same focus word. In the following description, the numerical value based on the focus word will be referred to as a focus match score (center-word_score). By using the focus extracting part 130, it is possible to select a response while a focus of the question is more taken into account.

<Case where Translation Model Applying Part 140 is Provided>

The translation model applying part 140 outputs a numerical value based on a probability of the answer being obtained from the input question as a translation likelihood, using the input question and the answer of the search-result-question-answer pair as input (S140). In this case, the score calculating part 160 calculates the score so that the score indicates higher appropriateness as the translation likelihood is higher (S160). Further, the translation model applying part 140 may further output a numerical value based on a probability that the input question can be obtained from the answer as a reverse translation likelihood (S140). In this case, the score calculating part 160 calculates the score so that the score indicates higher appropriateness as the reverse translation likelihood is higher (S160).

It is possible to use a translation model to calculate the translation likelihood (translation score). The translation model is statistical information for rewriting and translating an inputted sentence into another sentence. For example, information indicating which word is likely to be rewritten into which word is held. This is typically used in machine translation. In recent years, this translation model is often expressed with a neural network, and study of rewriting a question into a response using a translation model (a seq2seq model, or also referred to as an encoder-decoder model) learned from a number of sentence pairs, is actively performed (Reference 4: Oriol Vinyals and Quoc Le, "A neural conversational model", arXiv preprint arXiv:1506.05869, 2015). With the translation model, it is possible to calculate a generation probability of an outputted sentence with respect to an inputted sentence as well as rewrite an inputted sentence. The generation probability expresses appropriateness of an outputted sentence with respect to an inputted sentence. Because this probability value becomes an extremely small value, specifically, a value of a log likelihood may be useful. Further, because a log likelihood becomes smaller depending on the number of words, normalization by dividing the log likelihood by the number of words may be useful. A value obtained by normalizing the log likelihood will be referred to as a translation likelihood (translation score). The translation model may be constructed by learning a model while a number of pairs of question sentences and response sentences are prepared. For example, it is possible to use a translation model construction tool which is used to realize actual translation service.

A number of sentence pairs are required to construct the translation model. In a case where there are a few question-answer pairs (for example, in a case where there are approximately 10,000 pairs), there is a possibility that an appropriate translation model cannot be constructed. In this case, first, an initial translation model is learned using approximately 500,000 question-answer pairs which are created while emphasis is placed on a quantity without a character is not particularly kept in mind. Thereafter, a translation model regarding a character may be constructed by adapting the translation model to question-answer pairs created assuming the predetermined character based on the initial translation model.

Further, when the translation model is learned, by performing learning while an inputted sentence is exchanged for an outputted sentence, it is possible to also construct a translation model which generates the inputted sentence from the outputted sentence. Therefore, a translation mode (which will be referred to as a "reverse translation model") may be constructed by exchanging an inputted sentence for an outputted sentence using a similar procedure. A probability obtained from this reverse translation model is a value indicating how appropriate a question sentence is in view of a response sentence. Also here, a value by dividing the log likelihood by the number of words may be obtained. This value will be referred to as a reverse translation likelihood (reverse translation score (translation score in a reverse direction)). The translation model applying part 140 returns the translation likelihood (translation score) and the reverse translation likelihood (reverse translation score (translation score in a reverse direction)) for the input question and the answer of the search-result-question-answer pair.

The translation model applying part 140 outputs at least the translation likelihood, and may also output the reverse translation likelihood. The translation likelihood and the reverse translation likelihood are also examples of the quantification information. At least the translation likelihood is inputted to the score calculating part 160 as the quantification information. The reverse translation likelihood may be also inputted to the score calculating part 160 as the quantification information. Because the translation likelihood and the reverse translation likelihood are not normalized between 0 and 1, it is difficult to integrate the translation likelihood and the reverse translation likelihood with numerical values based on other quantification information. Therefore, the score calculating part 160 sorts the question-answer pairs respectively in descending order of values of the translation likelihood and in descending order of values of the reverse translation likelihood to obtain rank r of the respective pairs. Then, the score calculating part 160 may convert the rank into values between 0 and 1 by applying Formula (1) to obtain a numerical value based on the translation likelihood and a numerical value based on the reverse translation likelihood. In the following description, the numerical value based on the translation likelihood is set as a translation score (translation_score), and the numerical value based on the reverse translation likelihood is set as a reverse translation score (rev_translation_score). Because it is possible to calculate a score while relevance between a question and an answer is taken into account by using the translation model applying part 140, it is possible to select a response while personality of a character is also taken into account.

<Case where Utterance Vector Extracting Part 150 is Provided>

The utterance vector extracting part 150 obtains utterance vectors indicating semantic content for the input question and the question of the search-result-question-answer pair (S150). In this case, the score calculating part 160 calculates a score so that the score indicates higher appropriateness as the utterance vector of the input question is more similar to the utterance vector of the question of the search-result-question-answer pair (S160).

For example, it is possible to use an approach of allocating a vector (word vector) having a fixed length to a word based on peripheral word information (Reference 5: Tomas Mikolov, Ilya Sutskever, Kai Chen, Greg S Corrado, and Jeff Dean, "Distributed representations of words and phrases and their compositionality", in Proc. NIPS, pages 3111-3119, 2013). This method is typically used in recent years because of convenience of being capable of dealing with a word as a vector having a fixed length. The utterance vector extracting part 150 analyzes morphemes of an inputted sentence and divides the inputted sentence into words. Then, word vectors which can be obtained through the technique described in Reference 5, or the like, for the respective words are acquired, and the vectors for all the words are added. Finally, a vector (utterance vector) indicating utterance may be obtained by normalizing norm to 1.

The utterance vector extracting part 150 outputs an utterance vector for the input question and an utterance vector for the question of the search-result-question-answer pair. The utterance vector is also an example of the quantification information. The utterance vector for the input question and the utterance vector for the question of the search-result-question-answer pair are inputted to the score calculating part 160 as the quantification information. The score calculating part 160 may obtain, for example, cosine similarity between the utterance vector for the input question and the utterance vector for the question of the search-result-question-answer pair as a numerical value based on the utterance vector. The cosine similarity indicates semantic similarity. In the following description, the numerical value based on the utterance vector is set as a semantic similarity score (semantic_similarity_score). By using the utterance vector extracting part 150, it is possible to select a response based on the utterance vector.

The score calculating part 160 calculates a score with respect to the input question for each of the search-result-question-answer pairs from the numerical value indicating appropriateness based on the search scheme and the numerical value based on the quantification information (S160). When the input question is Q, the question of the search-result-question-answer pair is Q', and the answer is A', a score score(Q, (Q', A')) may be obtained, for example, as follows.

$$\text{score}(Q,(Q',A'))=w_1 \cdot \text{search\_score}+ \\ w_2 \cdot \text{qtypes\_match\_score}+w_3 \cdot \text{center-word\_score}+ \\ w_4 \cdot \text{translation\_score}+w_5 \cdot \text{rev\_translation\_score}+ \\ w_6 \cdot \text{semantic\_similarity\_score} \qquad (2)$$

where $w_1, \ldots, w_6$ are weight for determining a numerical value on which emphasis is to be placed. All weight may be set at 1.0, or may be tuned so that optimal performance can be obtained in accordance with the assumed input question and the question-answer pairs recorded in the recording part 190. Note that, in a case where the information acquiring part 121 includes only part of the question type estimating part 120, the focus extracting part 130, the translation model applying part 140, and the utterance vector extracting part 150, a numerical value based on the quantification information which does not exist may be excluded from Formula (2). The score calculating part 160 outputs the search-result-question-answer pairs to which the above-described scores are provided. The question-answer pairs to which the above-described scores are provided are inputted to the ranking part 170.

The ranking part 170 selects the search-result-question-answer pairs of the predetermined number in descending order of appropriateness indicated by the scores, and outputs the answers of the selected search-result-question-answer pairs as responses (S170). In the above-described example, because a greater value of the score indicates higher appropriateness, the ranking part 170 may select M search-result-question-answer pairs in descending order of values of the scores, and output the answers of the selected search-result-question-answer pairs as responses. Note that, if M=5, 5 responses are outputted. In a case where it is desired to output only one response like a chatbot, M may be set such that M=1.

According to the response selecting apparatus of the first embodiment, because the question-answer pair is selected by quantifying appropriateness of the question-answer pair for the input question also with a different perspective as well as searching for the question-answer pair from question-answer pairs whose meaning is close to meaning of the input question (with a perspective as to not only whether important content words match), it is possible to output a more appropriate answer as a response. Further, by tuning weight of Formula (2), it is possible to set optimal performance in accordance with the assumed input question and the recorded question-answer pairs.

Modified Example

Note that the response selecting apparatus 100 does not have to be constituted with one chassis, and may employ a configuration where respective components are disposed at different chassis connected with a communication line. For example, the respective components may be disposed separately at a server apparatus and a client apparatus so as to realize a configuration where the server apparatus returns a ranking result in response to a request from the client apparatus.

Second Embodiment

<Response Selecting Apparatus>

While, in the first embodiment, only the recording part 190 records the question-answer pairs, the response selecting apparatus 200 of the second embodiment also includes an extension recording part 290 in addition to the recording part 190. Note that, in the present embodiment, the recording part 190 will be also referred to as a basic recording part 190. In the extension recording part 290, question-answer pairs generated through an "extended role play-based utterance set generation apparatus and method" which will be described later, are recorded.

FIG. 1 illustrates a functional configuration example of the response selecting apparatus of the second embodiment. FIG. 2 illustrates a processing flow example of the response selecting apparatus of the second embodiment. The response selecting apparatus 200 of the second embodiment outputs one or a plurality of responses with respect to an input question which is an inputted question. For example, M may be preset so that M responses are outputted. M is an integer equal to or greater than 1. For example, M may be set such that M=5, or, in a case where it is desired to output only one response like a chatbot, M may be set such that M=1. The response selecting apparatus 200 includes the recording part 190, the extension recording part 290, a document searching part 210, the information acquiring part 121, a score calculating part 260, and the ranking part 170.

The document searching part 210 searches for question-answer pairs from the question-answer pairs recorded in the recording part 190 and the extension recording part 290 using the input question as input using a predetermined search scheme, and outputs the pairs as search-result-question-answer pairs (S210). For example, it is only necessary to predetermine that up to N question-answer pairs are set as the search-result-question-answer pairs, and, in a case where $N_1$ pairs are searched from the recording part 190, search for $N_2$ (=$N-N_1$) pairs from the extension recording part 290, so that a total of N search-result-question-answer pairs are outputted. N is an integer equal to or greater than M, and $N_1$ and $N_2$ are integers equal to or less than N. For example, N may be set such that N=10. Note that, while N is preferably equal to or greater than 2, N may be equal to or greater than 1. As the document searching part 210, a document search engine as described in Reference 1, which is typically used, may be used. Specifically, the document searching part 210 may extract content words (such as a noun, a verb and an adjective) from the input question through morphological analysis, search for a question-answer pair having a question including more content words which match important content words in the input question, and output the question-answer pair. Further, the document searching part 210 also outputs a numerical value indicating a degree of match of the important content words, and this numerical value is inputted to the score calculating part 260.

The information acquiring part 121 is the same as that in the first embodiment. The information acquiring part 121 may acquire information for quantifying appropriateness of the search-result-question-answer pairs with respect to the input question, for N search-result-question-answer pairs without distinguishing the pairs by the recording parts in which the pairs are recorded, and output the information as the quantification information (S121).

The score calculating part 260 calculates a score with respect to the input question for each of the search-result-question-answer pairs from the numerical value indicating appropriateness based on the search scheme and the numerical value based on the quantification information (S260). Further, the score calculating part 260 may, for example, weight the pairs so that the search-result-question-answer pairs searched from the recording part 190 are more likely to be selected while distinguishing the pairs by the recording parts in which the pairs are recorded. Because responses based on the question-answer pairs extended using an "extended role play-based utterance set generation apparatus and method" which will be described later (the question-answer pairs recorded in the extension recording part 290) are versatile compared to responses based on the question-answer pairs recorded in the recording part 190, while the translation likelihood and the reverse translation likelihood tend to be higher, because the responses include less information, a satisfaction level of a listener (a person who receives the answer) tends to be lower. Therefore, the translation likelihood and the reverse translation likelihood may be weighted so that the search-result-question-answer pairs recorded in the recording part 190 are more likely to be selected. That is, the score calculating part 260 may calculate scores so that scores of the search-result-question-answer pairs recorded in the recording part 190 indicate higher appropriateness than scores of the search-result-question-answer pairs recorded in the extension recording part 290.

A specific example of weighting will be described below.

(Example 1) Among six scores to be obtained at the score calculating part 260, as search scores, an inverse of a number obtained by ranking $N_1$ search-result-question-answer pairs recorded in the recording part 190, and an inverse of a number obtained by ranking $N_2$ search-result-question-answer pairs recorded in the extension recording part 290 are respectively used. That is, the search scores are independently obtained for the respective recording parts. As the translation scores and the reverse translation scores, an inverse of a number obtained by collectively ranking N pairs without the pairs being distinguished by the recording parts from which the pairs are selected is used.

(Example 2) The translation likelihoods (translation scores) and the reverse translation likelihoods (reverse translation scores) of the search-result-question-answer pairs from the extension recording part 290 are multiplied by a constant (for example, 0.8).

(Example 3) It is also possible to determine weight as appropriate for combination of grid search of six scores to be obtained at the score calculating part 260 (for example, 10 levels from 0.1 to 1.0 with 0.1 increments) (whether the pairs are the search-result-question-answer pairs from the recording part 190 or the search-result-question-answer pairs from the extension recording part 290), for a specific data set such as a data set which becomes teacher data of questions and answers.

The ranking part 170 is the same as that in the first embodiment. According to the response selecting apparatus of the second embodiment, it is possible to obtain effects similar to those obtained from the response selecting apparatus of the first embodiment and realize a response while a character is role-played.

<Extended Role Play-Based Utterance Set Generation Apparatus and Method>

Figure 3:
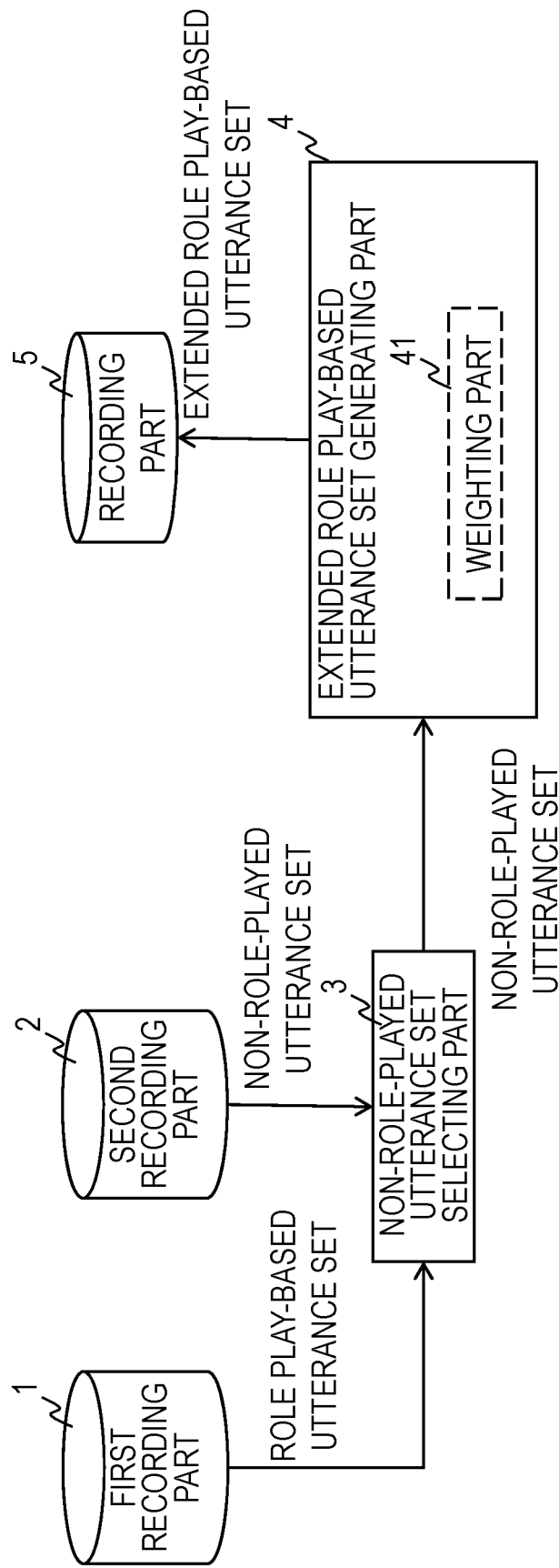
FIG. 3 is a view illustrating an example of a functional configuration of an extended role play-based utterance set generation apparatus according to the second embodiment.

First, a typical example of the extended role play-based utterance set generation apparatus and method will be described. As illustrated in FIG. 3, the extended role play-based utterance set generation apparatus includes, for example, a first recording part 1, a second recording part 2, an non-role played utterance set selecting part 3, an extended role play-based utterance set generating part 4 and a recording part 5.

Figure 4:
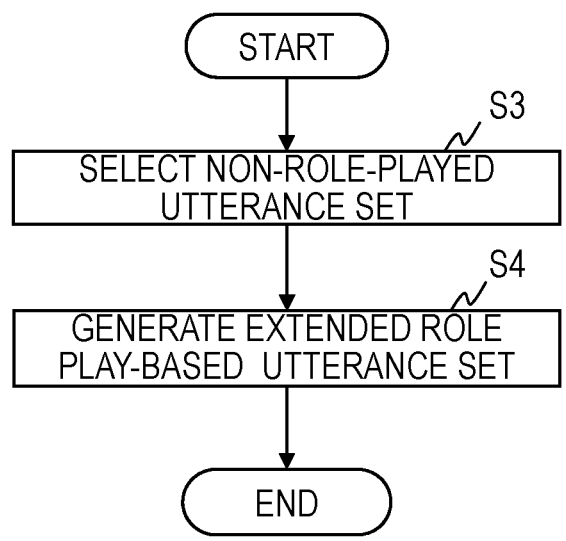
FIG. 4 is a view illustrating an example of a processing procedure of an extended role play-based utterance set generation method according to the second embodiment.

The extended role play-based utterance set generation method is, for example, realized by respective components of the extended role play-based utterance set generation apparatus performing processing from step S3 to step S4 described below and illustrated in FIG. 4.

The respective components of the extended role play-based utterance set generation apparatus will be described below.

<First Recording Part 1>

In the first recording part 1, I role play-based utterance sets i=($t_i(1)$, $t_i(2)$) (i=1, . . . , I) are recorded.

I is a predetermined positive integer. For example, I is an integer equal to or greater than 2. The role play-based utterance set i includes two pieces of utterance of first utterance $t_i(1)$ and second utterance $t_i(2)$ which is associated with the first utterance $t_i(1)$ and which is made to the first utterance $t_i(1)$ while a predetermined character is role-played.

For example, the first utterance is utterance of a question, and the second utterance is utterance of an answer to the question.

Note that the role play-based utterance set i may be recorded in the first recording part 1 along with utterance IDs for identifying the first utterance $t_i(1)$ and the second utterance $t_i(2)$.

An example of the first utterance $t_i(1)$ and the second utterance $t_i(2)$ is ($t_i(1)$, $t_i(2)$)=("What is your favorite food?", "I'd eat anything as long as it's edible!"). Another example of the first utterance $t_i(1)$ and the second utterance $t_i(2)$ is ($t_i(1)$, $t_i(2)$)=("How was the battle of Kanegasaki-noki-kuchi?", "Even I was prepared to meet my end").

Collection of role play-based utterance sets to be recorded in the first recording part 1 is performed through, for example, a website as follows. First, a website for having persons communicate while role playing a predetermined character such as an actual famous person (such as historical figure, an actor/actress and a narrator), and an imaginary character (such as a character in a novel and a cartoon character), in a form of questions and answers, is built. Then, on this website, a plurality of (for example, approximately 50, or more) people are asked to post responses to a predetermined question while they role play a predetermined character. Further, it is also possible to ask people to post the question itself as well as post responses, so that the posted question is included in the predetermined question for people who will post responses thereafter. A set of the predetermined question and respective responses posted for the question becomes a candidate for the role play-based utterance set. Note that IDs are provided to the respective responses to identify responses which are the second utterance $t_i(2)$.

Then, among "sets of a predetermined question and respective responses posted for the question", for example, in a case where there is a second utterance set which has a "word string of a response" which is similar to or the same as a "word string of a response" of a certain utterance set (hereinafter, a first utterance set), and which is different from the first utterance set, each of the first utterance set and the second utterance set may be recorded in the first recording part 1 as a "role play-based utterance set". Alternatively, for example, in a case where there exists a second utterance set which has a "character string of a predetermined question" which is similar to or the same as a "character string of a predetermined question" of the first utterance set, which has a "character string of a response" which is similar to or the same as a "character string of a response" of the first utterance set, and which is different from the first utterance set, for each of the "predetermined question" and the "responses" posted for the question of the first utterance set, each of the first utterance set and the second utterance set may be recorded in the first recording part 1 as the "role play-based utterance set". In other words, among the "set of the predetermined question and the respective responses posted for the question", an utterance set in which there are two or more sets for which the "responses" are similar or the same, or both the "questions" and the "responses" are similar or the same, may be recorded in the first recording part 1 as the "role play-based utterance set". Here, similar means that similarity between character strings satisfies a predetermined criterion. For example, if the "responses" are similar, it means that similarity between character strings of arbitrary two responses exceeds a predetermined criterion. For example, if both the "questions" and the "responses" are similar, it means that a value obtained by performing arithmetic mean (or square mean) on similarity A between character strings of arbitrary two predetermined questions, and similarity B between character strings of two responses respectively to the two predetermined questions exceeds a predetermined criterion, or both the similarity A and the similarity B exceed the predetermined criterion. Definition and examples of the similarity will be described later. In this manner, by setting a candidate for the role play-based utterance set in which there is a candidate for the role play-based utterance set in which the "responses" are similar or the same, or both the "questions" and the "responses" are similar or the same among candidates for the role play-based utterance set, as the "role play-based utterance set", it is possible to exclude data maliciously answered by causing erroneous data to be learned, or the like. By this means, it is possible to improve correctness of data.

Note that it is also possible to allow assessment of the respective posted responses as to personality of a predetermined character to be voted on. The assessment of a certain response which is the posted second utterance $t_i(2)$ as to personality of a predetermined character is recorded in the first recording part 1 along with the role play-based utterance set i of the second utterance $t_i(2)$.

Among the "set of the predetermined question and the respective responses which are posted in this manner", the "number of pieces of data" obtained by counting the number of sets which are similar or the same may be recorded in the first recording part 1 in association with the role play-based utterance set.

Note that the IDs for identifying the first utterance $t_i(1)$ and the second utterance $t_i(2)$ which are a candidate for the role play-based utterance set immediately after being collected from the above-described website are provided, for example, as will be described in FIG. 5 and below. First, utterance IDs are respectively provided to pieces of utterance including the first utterance $t_i(1)$ and the second utterance $t_i(2)$. Further, in a case where the utterance is the second utterance $t_i(2)$, a question source ID is further provided. In a case where the utterance is the first utterance $t_i(1)$, because the utterance is a question itself, the question source ID is not provided. Therefore, in FIG. 5, "None" is described in a field of the question source ID in a case where the utterance is the first utterance $t_i(1)$. Note that because the first utterance $t_i(1)$ can correspond to the second utterance $t_i(2)$ only on a one-to-one basis, there is a case where different question source IDs are provided for a plurality of pieces of second utterance $t_i(2)$ whose utterance content is the same. In FIG. 5, question source IDs of 1 and 2 are respectively provided to the second utterance $t_i(2)$ whose utterance IDs are 3 and 4, and whose utterance content is the same and "I'd eat anything as long as it's edible!".

As described above, while an utterance set which appears more than once in candidates for the role play-based utterance set is recorded in the first recording part 1 as the role play-based utterance set, in which case, utterance IDs for identifying the first utterance $t_i(1)$ and the second utterance $t_i(2)$ of the role play-based utterance set i are provided, for example, as illustrated in FIG. 6. In FIG. 6, utterance IDs newly starting from 1 are provided to the role play-based utterance sets.

Processing in step S3 and subsequent step which will be described later is performed for each piece of the second utterance $t_i(2)$.

<Second Recording Part 2>

In the second recording part 2, J non-role-played utterance sets $j=(t'_j(1), t'_j(2))$ (j=1, . . . , J) are recorded.

J is a predetermined positive integer. For example, J is an integer equal to or greater than 2.

A non-role-played utterance set includes two pieces of utterance of first utterance $t'_j(1)$ and second utterance $t'_j(2)$ which is associated with the first utterance $t'_j(1)$ and which is made to the first utterance $t'_j(1)$.

An example of the first utterance $t'_j(1)$ and the second utterance $t'_j(2)$ is $(t'_j(1), t'_j(2))$=("What do you want for dinner tonight?", "I'll eat anything as long as it's edible!").

Another example of the first utterance $t'_j(1)$ and the second utterance $t'_j(2)$ is $(t'_j(1), t'_j(2))$=("Yesterday's earthquake was scary, wasn't it?", "Even I was prepared to meet my death").

Note that information as to the non-role-played utterance set j can be obtained from a website such as, for example, Twitter (registered trademark) on which communication of dialogue is expressed in text.

<Non-Role-Played Utterance Set Selecting Part 3>

To the non-role-played utterance set selecting part 3, the second utterance $t_i(2)$ of the role play-based utterance set i read from the first recording part 1, and the non-role-played utterance set j read from the second recording part 2 are input.

The non-role-played utterance set selecting part 3 selects from the second recording part 2, one or more non-role-played utterance sets j corresponding to the second utterance $t'_j(2)$ which is the same as or similar to the second utterance $t_i(2)$ of each of the role play-based utterance sets i read from the first recording part 1 (step S3).

The selected non-role-played utterance sets j are output to the extended role play-based utterance set generating part 4.

For example, n non-role-played utterance sets $(t'_1(1), t'_1(2)), \ldots, (t'_n(1), t'_n(2))$ are selected as the non-role-played utterance sets corresponding to the second utterance $t'_j(2)$ which is the same as or similar to the second utterance $t_i(2)$, where n is a positive integer equal to or greater than 1 and equal to or less than J.

The second utterance $t'_j(2)$ which is the same as or similar to the second utterance $t_i(2)$ is the second utterance $t'_j(2)$ whose similarity with the second utterance $t_i(2)$ exceeds a predetermined criterion.

The similarity is an index such as the Levenshtein distance, the normalized Levenshtein distance, the COS similarity, and the Word Movers Distance, which indicates closeness between character strings which constitute utterance. The similarity only requires to be an index indicating closeness between character strings, and is not limited to the Levenshtein distance, the normalized Levenshtein distance, the COS similarity, and the Word Movers Distance.

Exceeding a predetermined criterion means that similarity is smaller than a predetermined criterion value in a case of using similarity which indicates higher similarity as a value is smaller, and means that similarity is greater than a predetermined criterion value in a case of using similarity which indicates higher similarity as a value is greater.

Description will be provided below using an example in a case where the similarity is the normalized Levenshtein distance.

The Levenshtein distance is a minimum number of times of operations required for converting one character string into another character string through insertion, deletion, or substitution of one character. Insertion of one character and deletion of one character are counted as one time of an operation, and substitution of one character is counted as two times of operations. In contrast, the normalized Levenshtein distance is a value obtained by dividing the Levenshtein distance by the number of characters of a longer character string out of two character strings. In other words, the normalized Levenshtein distance NLD(r, r') of a character string r and a character string r' is NLD(r, r')=(Levenshtein distance of r and r')/max(|r|, |r'|). Here, |r| is the number of characters of the character string r, and |r'| is the number of characters of the character string r'. The normalized Levenshtein distance becomes a value equal to or greater than 0 and equal to or less than 1. The Levenshtein distance and the normalized Levenshtein distance indicate that similarity is higher as the value is smaller.

For example, it is assumed that two character strings r, r' are r="ice cream", and r'="dry ice". In this case, the Levenshtein distance and the normalized Levenshtein distance of the two character strings r, r' can be obtained as follows. The character string of "ice cream" can be converted into the character string of "dry ice" through deletion and insertion described below.

"ice cream"
Delete "m"
"ice crea"
Delete "a"
"ice cre"
Delete "e"
"ice cr"
Delete "r"
"ice c"
Delete "c"
"ice "
Delete a space after "e"
"ice"
Insert "d" before the first character
"dice"
Insert "r" before the second character
"drice"
Insert "y" before the third character
"dryice"
Insert a space before the fourth character
"dry ice"

In this manner, the character string of "ice cream" can be converted into the character string of "dry ice" through ten times of operations including six times of deletion and four times of insertion. Therefore, the Levenshtein distance of the character string of "ice cream" and the character string of "dry ice" is 10.

The number of characters |r| of the character string r of "ice cream" is 9, and the number of characters |r'| of the character string r' of "dry ice" is 7. Therefore, the normalized Levenshtein distance NLD(r, r')=(Levenshtein distance of r and r')/max(|r|, |r'|)=10/max(9, 7)≈10/9≈1.11 . . . . Given that similarity is higher as the normalized Levenshtein distance is closer to 0, it can be understood that the character string of "ice cream" is practically not similar to the character string of "dry ice".

It is assumed that two characters r, r' are r="chocolate-covered donut", and r'="chocolate topped donut". In this case, the character string of "chocolate-covered donut" can be converted into the character string of "chocolate-topped donut" through six times of operations including deletion of three characters: the eleventh character of "c"; the twelfth character of "v"; and the twelfth character of "e", insertion of "t" before the eleventh character, insertion of "p" before the thirteenth character, and insertion of "p" before the thirteenth character. Further, the number of characters of the character string of "chocolate-covered donut" is 23, and the number of characters of the character string of "chocolate-topped donut" is 22. Therefore, in this case, the normalized Levenshtein distance NLD(r, r')=6/23=0.26. Therefore, the character string of "chocolate-covered donut" is relatively similar to the character string of "chocolate-topped donut".

In a case where the normalized Levenshtein distance is used as the similarity, the non-role-played utterance set selecting part 3 selects from the second recording part 2, one or more non-role-played utterance sets j corresponding to the second utterance $t'_j(2)$ whose normalized Levenshtein distance with the second utterance $t_i(2)$ is smaller than a predetermined criterion value. The predetermined criterion value in this case is a value greater than 0 and smaller than 1, and is, for example, 0.1.

For example, it is assumed that the second utterance $t_i(2)$="I'd eat anything as long as it's edible!", and the predetermined criterion value=0.2. Further, it is assumed that the non-role-played utterance set j of $(t'_j(1), t'_j(2))$= ("What do you want for dinner tonight?", "I'll eat anything as long as it's edible!") is recorded in the recording part 2.

First, description will be provided in a case of Japanese.

The character string of "Ku-e-re-ba nan-de-mo yo-i-wa!" can be converted into the character string of "Ku-e-re-ba nan-de-mo i-i-wa!" through two times of operations of deletion of the eighth character of "yo" and insertion of "i" before the eighth character, or one time of an operation of substitution of "i" for "yo" of the eighth character. Therefore, the Levenshtein distance of the character string of "Ku-e-re-ba nan-de-mo yo-i-wa!" and the character string of "Ku-e-re-ba nan-de-mo i-i-wa!" is 2. Further, the number of characters of the character string of "Ku-e-re-ba nan-de-mo yo-i-wa!" and the number of characters of the character string of "Ku-e-re-ba nan-de-mo i-i-wa!" are 11. Therefore, the normalized Levenshtein distance of the character string of "Ku-e-re-ba nan-de-mo yo-i-wa!" and the character string of "Ku-e-re-ba nan-de-mo i-i-wa!" is 2/11≈0.18. Because 0.18<0.2, the non-role-played utterance sentence selecting part 3 selects a non-role-played utterance set j of $(t'_j(1), t'_j(2))$=("What do you want for dinner tonight?", "Ku-e-re-ba nan-de-mo i-i-wa!") as the non-role-played utterance set j corresponding to the second utterance $t'_j(2)$ whose normalized Levenshtein distance with the second utterance $t_i(2)$ ="Ku-e-re-ba nan-de-mo yo-i-wa!" is smaller than the predetermined criterion value of 0.2.

Description will be provided next in a case of English.

The character string of "I'd eat anything as long as it's edible!" can be converted into the character string of "I'll eat anything as long as it's edible!" through three times of operations of deletion of the third character of "d", insertion of "1" before the third character, and insertion of "1" before the third character. Therefore, the Levenshtein distance of the character string of "I'd eat anything as long as it's edible!" and the character string of "I'll eat anything as long as it's edible!" is 3. Further, the number of characters of the character string of "I'll eat anything as long as it's edible!" is 42, and the number of characters of the character string of "I'd eat anything as long as it's edible!" is 41. Therefore, the normalized Levenshtein distance of the character string of "I'd eat anything as long as it's edible!" and the character string of "I'll eat anything as long as it's edible!" is 3/42≈0.071. Because 0.071<0.2, the non-role-played utterance set selecting part 3 selects a non-role-played utterance set j of $(t'_j(1), t'_j(2))$=("What do you want for dinner tonight?", "I'll eat anything as long as it's edible!") as the non-role-played utterance set j corresponding to the second utterance $t'_j(2)$ whose normalized Levenshtein distance with the second utterance $t_i(2)$="I'd eat anything as long as it's edible!" is smaller than the predetermined criterion value of 0.2.

In a case where assessment as to personality of a predetermined character is provided to the second utterance $t_i(2)$ recorded in the first recording part 1, the non-role-played utterance set selecting part 3 may perform the above-described processing in step S3 by preferentially using the role play-based utterance set i of the second utterance $t_i(2)$ for which assessment as to personality of a predetermined character is high. For example, the non-role-played utterance set selecting part 3 may perform the above-described processing in step S3 on only the role play-based utterance set i of the second utterance $t_i(2)$ for which assessment as to personality of a predetermined character is equal to or higher than a predetermined criterion value.

<Extended Role Play-Based Utterance Set Generating Part 4>

To the extended role play-based utterance set generating part 4, one or more non-role-played utterance sets selected at the non-role-played utterance set selecting part 3 are input.

The extended role play-based utterance set generating part 4 associates the first utterance $t'_j(1)$ of each of the non-role-played utterance sets j selected at the non-role-played utterance set selecting part 3 with the second utterance $t_i(2)$ of the role play-based utterance set i to make an extended role play-based utterance set $(t'_j(1), t_i(2))$, and outputs the extended role play-based utterance set $(t'_j(1), t_i(2))$ (step S4).

The generated extended role play-based utterance set is recorded in the recording part 5. Processing of recording the generated extended role play-based utterance set in the recording part 5 is performed at an arbitrary timing. In other words, the processing of recording the generated extended role play-based utterance set in the recording part 5 may be performed every time the extended role play-based utterance set is generated, may be performed after all of one or more extended role play-based utterance sets for certain second utterance $t_i(2)$ are generated, or may be performed only once after all of one or more extended role play-based utterance sets are respectively generated for a plurality of pieces of second utterance $t_i(2)$.

For example, it is assumed that n non-role-played utterance sets $(V_1(1), t'_1(2)), \ldots, (t'_n(1), t'_n(2))$ are selected at the non-role-played utterance set selecting part 3 as the non-role-played utterance set j corresponding to the second utterance $t'_j(2)$ which is the same as or similar to the second utterance $t_i(2)$. In this case, by $t'_j(1)$ being respectively associated with $t_i(2)$, n extended role play-based utterance sets $(t'_1(1), t_i(2)), \ldots, (t'_n(1), t_i(2))$ are generated.

For example, it is assumed that one non-role-played utterance set of $(t'_j(1), t'_j(2))$=("What will you eat if you are a bit hungry?", "I'll eat anything as long as its edible!") is selected at the non-role-played utterance set selecting part 3 as the non-role-played utterance set j corresponding to the second utterance $t'_j(2)$ which is the same as or similar to the second utterance $t_i(2)$="I'd eat anything as long as it's edible!". In this case, by the first utterance $t'_j(1)$="What will you eat if you are a bit hungry?" being associated with the second utterance $t_i(2)$="I'd eat anything as long as it's edible!", one extended role play-based utterance set of $(t'_j(1), t_i(2))$=("What will you eat if you are a bit hungry?", "I'd eat anything as long as it's edible!") is generated.

In an approach for improving quality of the dialogue system which has been proposed so far, appropriateness of the second utterance which is an answer to the first utterance has been considered. In contrast, in an approach of the above-described embodiment, it is considered to expand the range of the first utterance which can be covered by the second utterance $t_i(2)$. The approach of the above-described embodiment is different from the approach which has been proposed so far in this point.

The approach of the above-described embodiment has an advantage that even if the range of the first utterance which can be covered by the second utterance $t_i(2)$ is expanded in this manner, because the second utterance which is an answer is the second utterance $t_i(2)$ itself of the role play-based utterance set obtained by a predetermined character being role-played, personality of the predetermined character is not lost.

Modified Examples of Extended Role Play-Based Utterance Set Generation Apparatus and Method Modified Example 1

The extended role play-based utterance set generating part 4 may include a weighting part 41 which provides larger weight to an extended role play-based utterance set including the same second utterance $t_i(2)$ as the number of pieces of the same second utterance $t_i(2)$ is larger in the second utterance $t_i(2)$ recorded in the first recording part 1.

In this case, in a dialogue apparatus and method which will be described later, the extended role play-based utterance set to which larger weight is provided is preferentially used.

It can be said that, as the number of pieces of the same second utterance $t_i(2)$ is larger in the second utterance $t_i(2)$ recorded in the first recording part 1, the same second utterance $t_i(2)$ expresses personality of a predetermined character more properly. Therefore, by providing larger weight to the extended role play-based utterance set including the same second utterance $t_i(2)$ as the number of pieces of the same second utterance $t_i(2)$ is larger in the second utterance $t_i(2)$ recorded in the first recording part 1 and causing the extended role play-based utterance set to be preferentially used at the dialogue apparatus and method, utterance generated by the dialogue apparatus and method expresses personality of the predetermined character more properly.

For example, it is assumed that, in the second utterance $t_i(2)$ recorded in the first recording part 1, the second utterance $t_i(2)$ of "I'd eat anything as long as it's edible!" appears ten times, the second utterance $t_i(2)$ of "I'd eat anything as long as it's sweet!" appears three times, and the second utterance $t_i(2)$ of "Castella is yummy!" appears once.

In this case, the weighting part 41 may provide weight of f(10) to the extended role play-based utterance set including the second utterance $t_i(2)$ of "I'd eat anything as long as it's edible!", may provide weight of f(3) to the extended role play-based utterance set including the second utterance $t_i(2)$ of "I'd eat anything as long as it's sweet!", and may provide weight of f(1) to the extended role play-based utterance set including the second utterance $t_i(2)$ of "Castella is yummy!", using f as a predetermined non-decreasing function.

Modified Example 2

The extended role play-based utterance set generating part 4 may include a weighting part 41 which provides larger weight to the same extended role play-based utterance sets as the number of the same extended role play-based utterance sets is larger in the extended role play-based utterance sets generated by the extended utterance set generating part 4.

In this case, in the dialogue apparatus and method which will be described later, the extended role play-based utterance set to which the larger weight is provided is preferentially used.

It can be said that, as the number of the same extended role play-based utterance sets is larger in the extended role play-based utterance sets generated by the extended role play-based utterance set generating part 4, correctness of the same extended role play-based utterance sets as an answer is higher. Therefore, by providing larger weight to the same extended role play-based utterance sets as the number of the same extended role play-based utterance sets is larger in the extended role play-based utterance sets generated by the extended role play-based set generating part 4 and causing the extended role play-based utterance sets to be preferentially used at the dialogue apparatus and method, correctness of utterance generated by the dialogue apparatus and method is increased.

Modified Example 3

It is also possible to combine the modified example 1 and the modified example 2.

In other words, the extended role play-based utterance set generating part 4 may include a weighting part 41 which provides larger weight to the extended role play-based utterance set including the same second utterance $t_i(2)$ as the number of pieces of the same second utterance $t_i(2)$ is larger in the second utterance $t_i(2)$ recorded in the first recording part 1, and provides larger weight to the same extended role play-based utterance sets as the number of the same extended role play-based utterance sets is larger in the extended role play-based utterance sets generated by the extended role play-based utterance set generating part 4.

By combining the modified example 1 and the modified example 2, it is possible to obtain effects of both the modified example 1 and the modified example 2. In other words, by combining the modified example 1 and the modified example 2, utterance generated by the dialogue apparatus and method expresses personality of predetermined character more properly and more correctly.

[Generation of Question-Answer Pairs to be Recorded in Extension Recording Part 290 of Response Selecting Apparatus 200]

In the above description, a typical example of the extended role play-based utterance set generation apparatus and method has been described. Here, how question-answer pairs to be recorded in the extension recording part 290 of the response selecting apparatus 200 are generated will be described. Note that the question-answer pairs recorded in the recording part 190 correspond to "role play-based utterance sets" recorded in the above-described first recording part 1, and the question-answer pairs recorded in the extension recording part 290 correspond to "extended role play-based utterance sets" recorded in the above-described recording part 5. The question-answer pairs recorded in the recording part 190 are recorded in the first recording part 1 (it is also possible to set the recording part 190 as the first recording part 1). Then, question-answer pairs collected in advance are recorded in the second recording part 2. For example, information of question-answer pairs from a website such as, for example, Twitter (registered trademark), on which communication of a dialogue is expressed in text may be collected and the information may be recorded in the second recording part 2.

Then, the generated question-answer pairs may be recorded in the recording part 5 by executing processing of the non-role-played utterance set selecting part 3 (step S3) and processing of the extended role play-based utterance set generating part 4 (step S4). That is, the generated question-answer pairs are the above-described extended role play-based utterance sets. More specifically, in step S3, the non-role-played utterance set selecting part 3 selects from the second recording part 2, one or more question-answer pairs including an answer which is the same as or similar to an answer read from the first recording part 1 (or the recording part 190). Note that step S3 may be performed in a case where similarity of assessment as to personality of a predetermined character between the read answer and the answer of the selected question-answer pair exceeds a predetermined criterion. The similarity is the same as that in the above-described typical extended role play-based utterance set generation apparatus and method. In step S4, a pair of the question of the question-answer pair which is selected by the non-role-played utterance set selecting part 3 and which is recorded in the second recording part 2 and the answer read by the non-role-played utterance set selecting part 3 from the first recording part 1 (or the recording part 190), is outputted as the generated question-answer pair, and recorded in the recording part 5 (or the extension recording part 290). By generating the question-answer pair to be recorded in the extension recording part 290 in this manner, it is possible to add pairs which are paired with questions in a variety of expression while maintaining personality of character in the answers of the question-answer pairs recorded in the recording part 190.

Note that it is also possible to use the above-described modified examples 1 to 3 of the extended role play-based utterance set generation apparatus and method. In this case, the extended role play-based utterance set generating part 4 includes a weighting part 41. Functions of the weighting part 41 are the same as those in the above-described modified examples 1 to 3. In a case where modified example 1 is used, as the number of the same answer recorded in the recording part 190 is larger, the question-answer pair including the same answer is recorded in the extension recording part 290 while larger weight is provided to the pair. In a case where modified example 2 is used, as the number of the same question-answer pair recorded in the extension recording part 290 is larger, the same question-answer pair is recorded in the extension recording part 290 while larger weight is provided to the pair. In either case, the question-answer pair to which larger weight is provided may be used preferentially, at the response selecting apparatus 200.

Modified Example

Note that the response selecting apparatus 200 does not have to be configured with one chassis, and may employ a configuration where the respective components are disposed at different chassis connected with a communication line so as to operate like one apparatus. For example, it is also possible to employ a configuration where the extension recording part 290 is provided at a chassis different from the recording part 190 and the document searching part 210 and is connected with a communication line, or the like.

Third Embodiment

<Response Selecting Apparatus>

Figure 7:
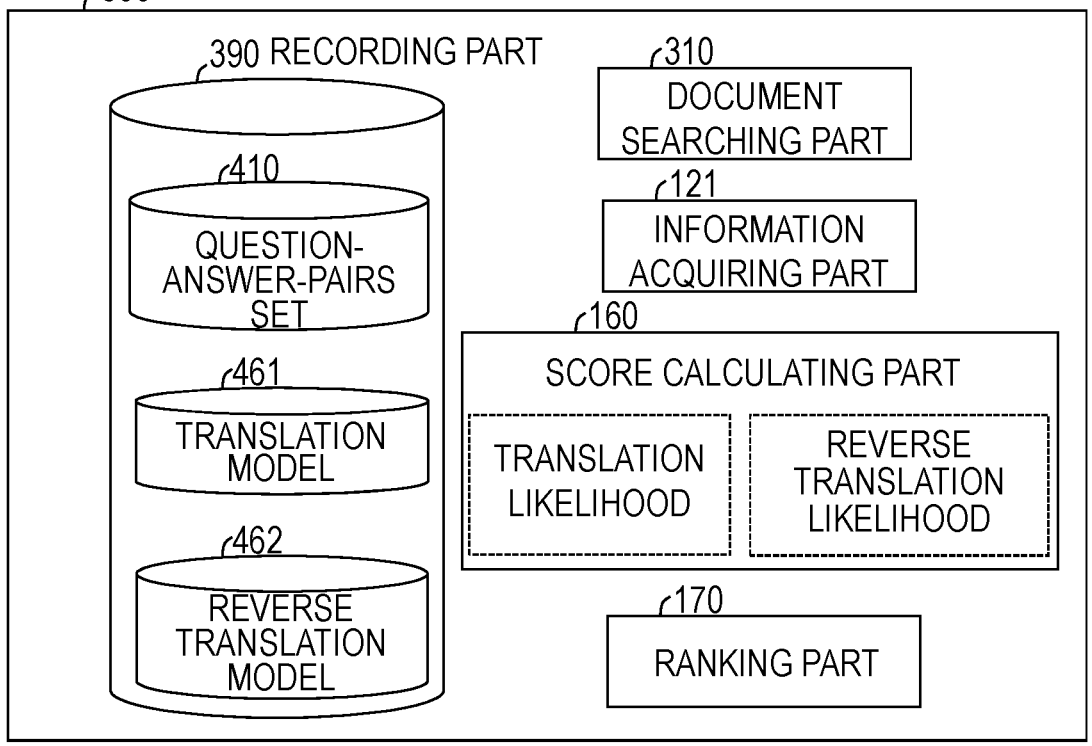
FIG. 7 is a view illustrating a functional configuration example of a response selecting apparatus according to a third embodiment.
Figure 8:
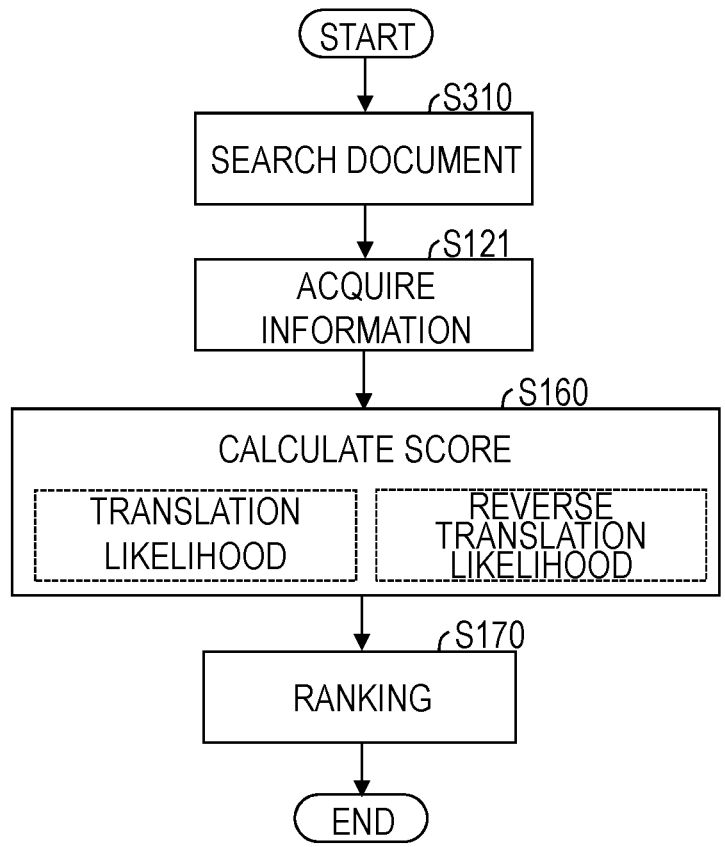
FIG. 8 is a view illustrating a processing flow example of the response selecting apparatus according to the third embodiment.

FIG. 7 illustrates a functional configuration example of a response selecting apparatus of a third embodiment. FIG. 8 illustrates a processing flow example of the response selecting apparatus of the third embodiment. The response selecting apparatus 300 of the third embodiment outputs one or a plurality of responses which indicate personality of a predetermined character with respect to an input question which is an inputted question. For example, M may be predetermined so that M responses are outputted. M is an integer equal to or greater than 1. For example, M may be set such that M=5, or, in a case where it is desired to output only one response like a chatbot, M may be set such that M=1. The response selecting apparatus 300 includes a recording part 390, a document searching part 310, the information acquiring part 121, the score calculating part 160 and the ranking part 170.

The recording part 390 records a question-answer-pairs set 410 which are pairs of questions and answers, and a learned translation model 461 for obtaining an answer from a question. The recording part 390 may further record a learned reverse translation model 462 for obtaining a question from an answer. The "learned translation model for obtaining an answer from a question" means a model indicating a probability of an answer being generated with respect to a question, and the "reverse translation model for obtaining a question from an answer" means a model indicating a probability of a certain question being asked when an answer is generated. The translation model 461 and the reverse translation model 462 are learned using a question-answer pair associated with an index indicating a degree of personality of a character of the answer in accordance with the degree indicated by the index. "Learning in accordance with the degree indicated by the index" means learning so that the generated probability becomes higher as the answer indicates personality closer to the character. For example, a model learning apparatus 400 which will be described later may be used for learning.

The question-answer-pairs set 410 may be constructed by a number of question-answer pairs being collected using a mechanism of a role play-based question answering. The number of question-answer pairs may be determined as appropriate in accordance with types of assumed questions, or the like. For example, approximately 10,000 question-answer pairs including answers which indicate personality of a character for an actual person A may be collected. Examples of the pair of the question and the answer can include a pair of a question: "Hello" and an answer: "Hi", a pair of a question: "How old are you?" and an answer: "I'm 30 years old", or the like, which are created assuming a predetermined character.

The document searching part 310 searches for question-answer pairs from question-answer pairs recorded in the recording part 390 using a predetermined search scheme using an input question as input in a similar manner to the document searching part of the first embodiment, and outputs the pairs as search-result-question-answer pairs (S310). For example, it is possible to predetermine so that up to N question-answer pairs are set as the search-result-question-answer pairs. N is an integer equal to or greater than M, and may be determined at, for example, 10. Note that, while N is preferably equal to or greater than 2, N may be equal to or greater than 1. As the document searching part 310, a document search engine as described in Reference 1, which is typically used, may be used. Specifically, it may extract content words (such as a noun, a verb and an adjective) from the input question through morphological analysis, search for a question-answer pair having the question including more content words which match important content words in the input question and output the question-answer pair. Further, the document searching part 110 may output a numerical value indicating a degree of match of the important content words, and this numerical value is inputted to the score calculating part 160.

The recording part 390 may further record an index indicating a degree of personality of a character of an answer for each of the question-answer pairs in association. In this case, the document searching part 310 may search for a question-answer pair from the question-answer pairs recorded in the recording part 390 also using this index.

Examples of the index indicating a degree of personality of a character includes, for example, a first index (numerical value indicating favorableness of the response) assessed by a person other than the character himself/herself, a second index (label indicating that the response is made by the character himself/herself) indicating that the response is made by the character himself/herself, a third index (label indicating that the response is approved by the character himself/herself) indicating that the character himself/herself approves that the response indicates personality of the character, or the like. In the following description, the character himself/herself is set as a person A.

The first index (numerical value indicating favorableness of the response) may be acquired using, for example, a mechanism in which an online user is asked to see a question-answer pair, and the index is incremented by one by the online user depressing a button when the online user feels the response indicates personality of the person A. If the button is depressed ten times for a certain response, the first index (numerical value indicating favorableness of the response) becomes 10. For example, this numerical value will be referred to as "closeness to personality of the character". In addition, it is also possible to allow the person A to take part in process of collecting questions and answers through role play-based question answering. In a case where the person A writes a response, by the response being labeled to indicate that the response is written by the person A, the label becomes the second index. This is a label indicating that the response is made by the character himself/herself, and this label will be referred to as a personal label. Finally, the person A is asked to see the collected question-answer pairs and select responses approved as favorable. A label indicating that the response is approved by the character himself/herself (third index) is provided to such a response. This label will be referred to as an approval label. In this manner, three types of additional information of the first index (closeness to personality of the character), the second index (personal label), and the third index (approval label) can be associated with the question-answer pairs. Not that the first index (closeness to personality of the character) which is a numerical value indicating favorableness of the response, the second index (personal label) which is a label indicating that the response is made by the character himself/herself, and the third index (approval label) which is a label indicating that the response is approved by the character himself/herself do not have to be exclusive. For example, it is also possible to make settings so that, if the character himself/herself inputs a numerical value indicating favorableness of the response, the response is regarded as being approved by the character himself/herself.

The document searching part 310 can search for a more appropriate question-answer pair by using the first index (closeness to personality of the character), the second index (personal label) and the third index (approval label) which are three types of additional information. For example, it is possible to realize search such as search from only pairs for which the first index (closeness to personality of the character) is equal to or greater than a threshold, search from only pairs to which personal labels are provided and search from only pairs to which approval labels are provided. By this means, it is possible to obtain a question-answer pair having an answer which indicates personality closer to personality of the person A. Meanwhile, because the number of question-answer pairs to be searched decreases by a search range being limited, the search range may be limited as appropriate while taking into account the number of question-answer pairs to be searched, or the like.

The information acquiring part 121 acquires information for quantifying appropriateness of the search-result-question-answer pairs with respect to the input question using the input question and the search-result-question-answer pairs as input in a similar manner to the first embodiment, and outputs the information as the quantification information (S121). The information acquiring part 121 of the present embodiment includes at least the translation model applying part 140, and obtains a translation likelihood (translation score) which is a numerical value based on a probability of the answer being obtained from the input question. The score calculating part 160 calculates a score with respect to the input question for each of the search-result-question-answer pairs based on the translation likelihood (translation score) (S160). The information acquiring part 121 may further obtain a reverse translation likelihood (reverse translation score) which is a numerical value based on a probability of the input question being obtained from the answer using the reverse translation model, and may calculate a score with respect to the input question for each of the search-result-question-answer pairs based on the translation likelihood (translation score) and the reverse translation likelihood (reverse translation score).

The translation model applying part 140 within the information acquiring part 121, for example, sorts the search-result-question-answer pairs in descending order of values indicated by the respective translation likelihoods (translation scores) to obtain rank r of the respective pairs. Then, the translation model applying part 140 may obtain a value between 0 and 1 by obtaining the translation score (translation_score) which is a numerical value based on the translation likelihood through $$1.0 - (r-1)/\text{max\_rank} \tag{3}$$

where max_rank is the number of the search-result-question-answer pairs. max_rank may be set at a maximum number N which can be searched by the document searching part 310. For example, in a case where max_rank=10, and r=5, the translation score (translation_score) which is a numerical value based on the translation likelihood becomes 0.6. The translation model applying part 140 may also obtain a reverse translation score (rev_translation_score) which is a numerical value based on the reverse translation likelihood in a similar manner by sorting the search-result-question-answer pairs in descending order of the reverse translation likelihoods (reverse translation scores) and applying Formula (3). Then, when the input question is Q, the question of the search-result-question-answer pair is Q', and the answer is A', a score score(Q, (Q, A')) may be obtained, for example, as follows.

$$score(Q,(Q',A'))=w_1 \cdot \text{translation\_score} + w_2 \cdot \text{rev\_translation\_score} \quad (4)$$

where $w_1$ and $w_2$ are weight for determining a numerical value on which emphasis is to be placed. Both weight may be set at 1.0, or tuned while taking into account characteristics of the translation model and the reverse translation model. The score score(Q, (Q', A')) becomes output of the score calculating part 160.

The ranking part 170 selects the search-result-question-answer pairs of the preset number in descending order of appropriateness indicated by the scores and outputs the answers of the selected search-result-question-answer pairs as responses (S170). In the above-described example, because a greater value of the score indicates higher appropriateness, the ranking part 170 may select M search-result-question-answer pairs in descending order of values of the scores, and output the answers of the selected search-result-question-answer pairs as responses. Note that if M=5, 5 responses are outputted. In a case where it is desired to output only one response like a chatbot, M may be set such that M=1.

According to the response selecting apparatus of the third embodiment, a translation model to be used by the score calculating part is learned using pairs of questions and answers associated with indexes indicating degrees of personality of characters of the answers in accordance with the degrees indicated by the indexes. Therefore, it is possible to assess whether the answer of the question-answer pair indicates personality of the character. Therefore, it is possible to obtain a response which indicates personality which is closer to personality of a predetermined character than that with the related art. Further, if the score calculating part also uses the reverse translation model, it is possible to obtain a response which indicates personality closer to personality of the character.

<Model Learning Apparatus>

Figure 9:
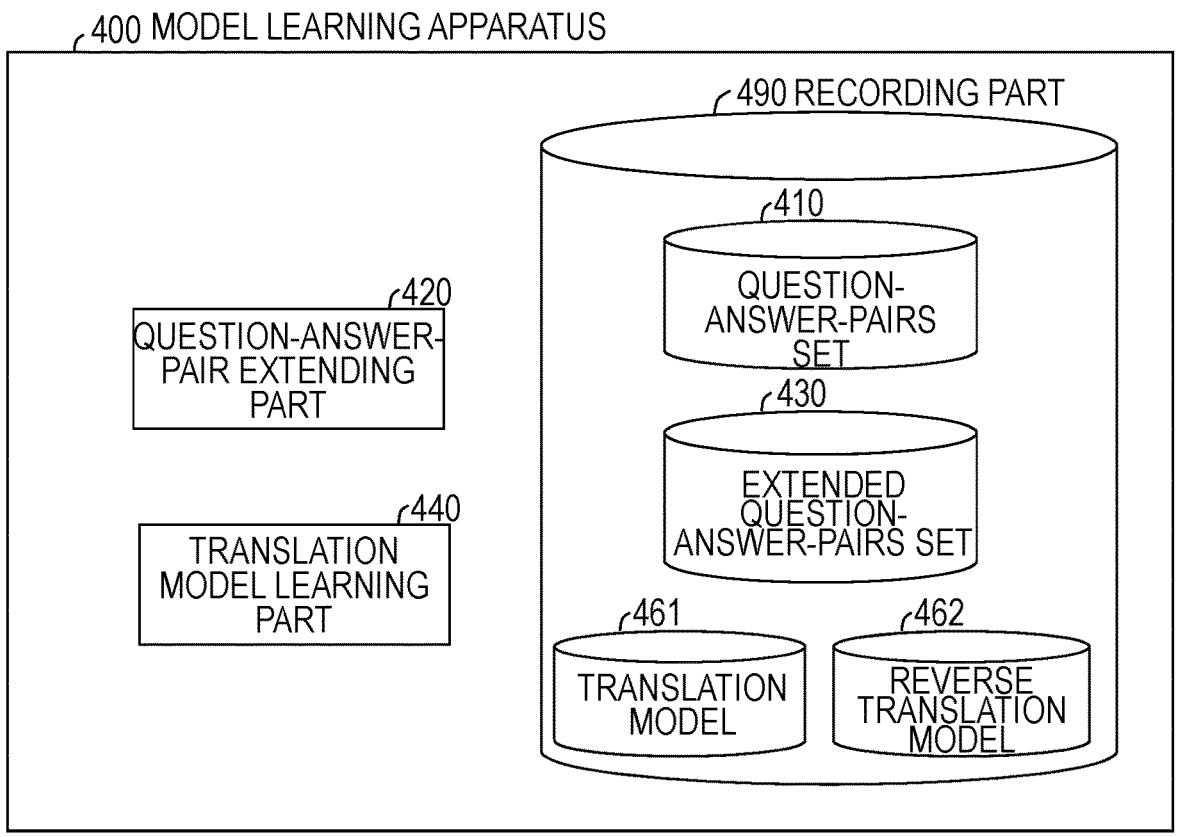
FIG. 9 is a view illustrating a functional configuration example of a model learning apparatus according to the third embodiment.
Figure 10:
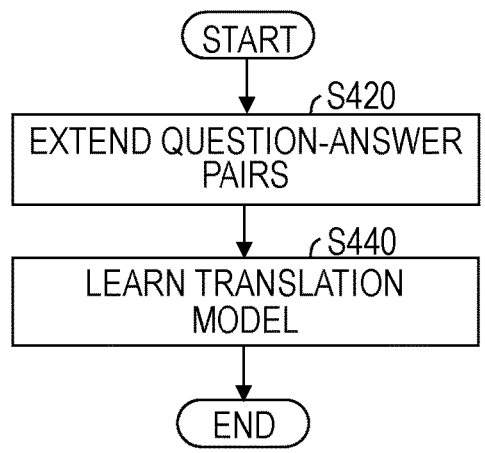
FIG. 10 is a view illustrating a processing flow example of the model learning apparatus according to the third embodiment.

FIG. 9 illustrates a functional configuration example of a model learning apparatus of the third embodiment. FIG. 10 illustrates a processing flow example of the model learning apparatus of the third embodiment. A model learning apparatus 400 of the third embodiment generates at least one of the learned translation model for obtaining an answer from a question and the learned reverse translation model for obtaining a question from an answer. The model learning apparatus 400 includes a recording part 490, a question-answer-pair extending part 420 and a translation model learning part 440.

The recording part 490 records a question-answer-pairs set 410 which are pairs of questions and answers, an extended question-answer-pairs set 430, a translation model 461 for obtaining an answer from a question and a reverse translation model 462 for obtaining a question from an answer. An index indicating a degree of personality of a character of an answer with respect to the predetermined character for each of the question-answer pairs is associated with the question-answer-pairs set 410.

The question-answer-pair extending part 420 generates extended question-answer pairs by increasing the number of question-answer pairs with which indexes indicating personality closer to personality of characters are associated (S420). For example, the question-answer-pair extending part 420 extends the question-answer pairs using the question-answer pairs and the first index (closeness to personality of the character), the second index (personal label) and the third index (approval label) which are three types of additional information as input. Specifically, the question-answer pairs may be extended through processing of (a) increasing the number of question-answer pairs to which the first indexes (closeness to personality of the character) are provided by x times, (b) increasing the number of question-answer pairs to which the second indexes (personal labels) are provided by y times, and (c) increasing the number of question-answer pairs to which the third indexes (approval labels) are provided by z times. In a case where three types of additional information are overlapping, the pairs may be extended using a priority rule. Specifically, it is possible to try extension in order of (b)>(c)>(a), and avoid extension again through other processing if extension is executed. While this method is a method of extension while emphasis is placed on the second index (personal label), it is also possible to use other priority rules. For example, it is also possible to place emphasis on (a). Further, x may be determined depending on the number of the first indexes (closeness to personality of the character). Specifically, x may be determined such that x=the number of first indexes (closeness to personality of the character)×c, where c is a constant and may be determined by a designer as appropriate. For example, c is 1.0, which means that the question-answer pairs are purely extended by the number corresponding to the number of the first indexes (closeness to personality of the character). y and z may be also determined by a designer as appropriate. For example, it is only necessary to determine y as 10 and z as 5. The question-answer-pair extending part 220 records the question-answer pairs extended through the above-described processing in the recording part 490 as elements of the extended question-answer-pairs set 430.

Increasing the number described above means that, when <Q: "How are you?", A: "I'm fine!"> is one question-answer pair, simple addition of the same question-answer pair. For example, doubling the number of this question-answer pair means addition of another <Q: "How are you?", A: "I'm fine!">. By increasing the number in this manner, statistic of words, or the like, included in this question-answer pair increases through learning processing, so that the question-answer pair is likely to be placed in a higher rank.

The translation model learning part 440 learns at least one of the translation model 461 and the reverse translation model 462 using the extended question-answer pairs (S440). Of course, the translation model learning part 440 may learn both the translation model 461 and the reverse translation model 462. Specifically, as described in the description of the response selecting apparatus 300, the translation model may be constructed by preparing a large number of pairs of question sentences and response sentences and learning the model. For example, a translation model construction tool which is used to realize actual translation service may be used. Further, in a case where there are a few (for example, approximately 10,000) question-answer pairs, there is a possibility that an appropriate translation model cannot be constructed. In this case, first, an initial translation model is learned using approximately 500,000 question-answer pairs which are created while emphasis is placed on quantity without a character being particularly kept in mind. Thereafter, a translation model regarding a character may be constructed by adapting the translation model to the question-answer pairs created assuming the predetermined character based on the initial translation model. Further, the reverse translation model may be constructed while the inputted sentence is exchanged for the outputted sentence using similar procedure.

According to the model learning apparatus of the third embodiment, the question-answer-pair extending part generates a larger number of extended question-answer pairs as the indexes associated with the question-answer pairs indicate personality closer to the personality of the character, and the translation model learning part learns the translation model or the reverse translation model using the extended question-answer pairs. Therefore, it is possible to realize learning so that the translation likelihood or the reverse translation likelihood becomes higher as the answers of the question-answer pairs indicate personality closer to the personality of the character. Accordingly, by using the translation model and the reverse translation model generated at the model learning apparatus of the third embodiment, the response selecting apparatus can obtain a response indicating personality closer to personality of a predetermined character than that obtained with the related art.

[Program, Recording Medium]

The above-described various kinds of processing may be executed in parallel or individually in accordance with processing performance of apparatuses which execute the processing or as necessary as well as executed in chronological order in accordance with the description. Further, it goes without saying that changes can be made as appropriate within the scope not deviating from the gist of the present invention.

In a case where the above-described configuration is realized with a computer, processing content of functions which should be provided at the respective apparatuses is described with a program. Then, by this program being executed at the computer, the above-described processing functions are realized on the computer.

The program describing this processing content can be recorded in a computer-readable recording medium. As the computer-readable recording medium, any medium such as, for example, a magnetic recording apparatus, an optical disk, a magnetooptical recording medium, and a semiconductor memory can be used.

Further, this program is distributed by, for example, a portable recording medium such as a DVD and CD-ROM in which the program is recorded being sold, given, lent, or the like. Still further, it is also possible to employ a configuration where this program is distributed by the program being stored in a storage apparatus of a server computer and transferred from the server computer to other computers via a network.

A computer which executes such a program, for example, first, stores a program recorded in the portable recording medium or a program transferred from the server computer in the storage apparatus of the own computer once. Then, upon execution of the processing, this computer reads the program stored in the recording medium of the own computer and executes the processing in accordance with the read program. Further, as another execution form of this program, the computer may directly read a program from the portable recording medium and execute the processing in accordance with the program, and, further, sequentially execute the processing in accordance with the received program every time the program is transferred from the server computer to this computer. Further, it is also possible to employ a configuration where the above-described processing is executed by a so-called ASP (Application Service Provider) type service which realizes processing functions only by an instruction of execution and acquisition of a result without the program being transferred from the server computer to this computer. Note that, it is assumed that the program in the present embodiment includes information which is to be used for processing by an electronic computer, and which is equivalent to a program (not a direct command to the computer, but data, or the like, having property specifying processing of the computer).

Further, while, in this embodiment, the present apparatus is constituted by a predetermined program being executed on a computer, at least part of the processing content may be realized with hardware.

DESCRIPTION OF REFERENCE NUMERALS 1 first recording part
2 second recording part
3 non-role played utterance set selecting part
4 extended role play-based utterance set generating part
41 weighting part
100, 200, 300 response selecting apparatus
110, 210, 310 document searching part
120 question type estimating part
121 information acquiring part
130 focus extracting part
140 translation model applying part
150 utterance vector extracting part
160, 260 score calculating part
170 ranking part
5, 190, 390 recording part
290 extension recording part
400 model learning apparatus
410 question-answer-pairs set
420 question-answer-pair extending part
430 extended question-answer-pairs set
440 translation model learning part
461 translation model
462 reverse translation model

What is claimed is:

1. A response selecting apparatus, which outputs one or a plurality of responses to an input question which is inputted a question, the response selecting apparatus comprising:
a recording medium in which a plurality of question-answer pairs which are pairs of questions and answers are recorded; and
processing circuitry configured to:
execute a document searching processing which searches for a question-answer pair from the question-answer pairs recorded in the recording medium using the input question as input using a predetermined search scheme, and outputs the question-answer pair as a search-result-question-answer pair;
execute an information acquiring processing which acquires information for quantifying appropriateness of the search-result-question-answer pair with respect to the input question using the input question and the search-result-question-answer pair as input, and outputs the information as quantification information;

execute a score calculating processing which calculates a score with respect to the input question for each of the search-result-question-answer pairs from a numerical value indicating appropriateness based on the search scheme and a numerical value based on the quantification information; and execute a ranking processing which selects the search-result-question-answer pairs of a predetermined number in descending order of appropriateness indicated by the scores, and outputs answers of the selected search-result-question-answer pairs as responses, wherein the information acquiring processing, as the quantification information, estimates information for specifying a question type of the input question and a question type of the search-result-question-answer pair, extracts word strings which become topics as focus words for the input question and the question of the search-result-question-answer pair, outputs a numerical value based on a probability of the answer being obtained from the input question as a translation likelihood and a numerical value based on a probability of the input question being obtained from the answer as a reverse translation likelihood using the input question and the answer of the search-result-question-answer pair as input, and obtains utterance vectors indicating a semantic content for the input question and the question of the search-result-question-answer pair; and the score calculating processing calculates a score(Q, (Q', A'))

as $score(Q,(Q',A')) = w_1 \cdot search\_score + w_2 \cdot qtypes\_match\_score + w_3 \cdot center\text{-}word\_score + w_4 \cdot translation\_score + w_5 \cdot rev\_translation\_score + w_6 \cdot semantic\_similarity\_score$ where Q is the input question, Q' is the question of the search-result-question-answer pair, A' is the answers, search_score is a numerical value indicating appropriateness based on the search scheme, qtypes_match_score is a numerical value indicating higher appropriateness as the question type of the input question better matches the question type of the search-result-question-answer pair based on the information for specifying the question type of the input question and the question type of the search-result-question-answer pair, center-word_score is a numerical value indicating higher appropriateness as the focus word of the input question better matches the focus word of the question of the search-result-question-answer pair, translation_score is a numerical value indicating higher appropriateness as the translation likelihood is higher, rev_translation_score is a numerical value indicating higher appropriateness as the reverse translation likelihood is higher, semantic_similarity_score is a numerical value indicating higher appropriateness as the utterance vector of the input question is more similar to the utterance vector of the question of the search-result-question-answer pair, and $w_1, \ldots, w_6$ are weight for determining a numerical value on which emphasis is to be placed.

2. The response selecting apparatus according to claim 1, wherein the question type of the input question includes a general question type and a detailed question type.

3. A non-transitory computer-readable recording medium on which the response selecting program for causing a computer to operate as a response selecting apparatus is recorded, the response selecting apparatus comprising:

a recording medium in which a plurality of question-answer pairs which are pairs of questions and answers are recorded; and processing circuitry configured to:

execute a document searching processing which searches for a question-answer pair from the question-answer pairs recorded in the recording medium using the input question as input using a predetermined search scheme, and outputs the question-answer pair as a search-result-question-answer pair;

execute an information acquiring processing which acquires information for quantifying appropriateness of the search-result-question-answer pair with respect to the input question using the input question and the search-result-question-answer pair as input, and outputs the information as quantification information;

execute a score calculating processing which calculates a score with respect to the input question for each of the search-result-question-answer pairs from a numerical value indicating appropriateness based on the search scheme and a numerical value based on the quantification information; and execute a ranking processing which selects the search-result-question-answer pairs of a predetermined number in descending order of appropriateness indicated by the scores, and outputs answers of the selected search-result-question-answer pairs as responses, wherein the information acquiring processing, as the quantification information, estimates information for specifying a question type of the input question and a question type of the search-result-question-answer pair, extracts word strings which become topics as focus words for the input question and the question of the search-result-question-answer pair, outputs a numerical value based on a probability of the answer being obtained from the input question as a translation likelihood and a numerical value based on a probability of the input question being obtained from the answer as a reverse translation likelihood using the input question and the answer of the search-result-question-answer pair as input, and obtains utterance vectors indicating a semantic content for the input question and the question of the search-result-question-answer pair; and the score calculating processing calculates a score(Q, (Q', A')) as $score(Q,(Q',A')) = w_1 \cdot search\_score + w_2 \cdot qtypes\_match\_score + w_3 \cdot center\text{-}word\_score + w_4 \cdot translation\_score + w_5 \cdot rev\_translation\_score + w_6 \cdot semantic\_similarity\_score$ where Q is the input question, Q' is the question of the search-result-question-answer pair, A' is the answers, search_score is a numerical value indicating appropriateness based on the search scheme, qtypes_match_score is a numerical value indicating higher appropriateness as the question type of the input question better matches the question type of the search-result-question-answer pair based on the information for specifying the question type of the input question and the question type of the search-result-question-answer pair, center-word_score is a numerical value indicating higher appropriateness as the focus word of the input question better matches the focus word of the question of the search-result-question-answer pair, translation_score is a numerical value indicating higher appropriateness as the translation likelihood is higher, rev_translation_score is a numerical value indicating higher appropriateness as the reverse translation likelihood is higher, semantic_similarity_score is a numerical value indicating higher appropriateness as the utterance vector of the input question is more similar to the utterance vector of the question of the search-result-question-answer pair, and $w_1, \ldots, w_6$ are weight for determining a numerical value on which emphasis is to be placed.

* * * * *